United States Patent
Lee et al.

(10) Patent No.: US 9,904,111 B2
(45) Date of Patent: Feb. 27, 2018

(54) LIQUID CRYSTAL DISPLAY

(71) Applicant: Samsung Display Co. Ltd., Yongin-si (KR)

(72) Inventors: Se Hyun Lee, Seoul (KR); Ik Han Oh, Cheonan-si (KR); Youn Hak Jeong, Cheonan-si (KR); Ki Pyo Hong, Hwaseong-si (KR); Wan Namgung, Asan-si (KR); Ho Jun Lee, Asan-si (KR); Dong Chul Shin, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/180,119

(22) Filed: Jun. 13, 2016

(65) Prior Publication Data
US 2017/0003549 A1    Jan. 5, 2017

(30) Foreign Application Priority Data
Jul. 3, 2015    (KR) .................. 10-2015-0095331

(51) Int. Cl.
*G02F 1/1337* (2006.01)
*G02F 1/1343* (2006.01)
*G02F 1/1362* (2006.01)

(52) U.S. Cl.
CPC .. *G02F 1/133707* (2013.01); *G02F 1/134309* (2013.01); *G02F 1/136209* (2013.01)

(58) Field of Classification Search
CPC ......... G02F 1/133707; G02F 1/134309; G02F 1/136209
See application file for complete search history.

(56) References Cited

U.S. PATENT DOCUMENTS

| | | | |
|---|---|---|---|
| 8,902,386 B2 | 12/2014 | Kwon et al. | |
| 2013/0201432 A1* | 8/2013 | Yun | G02F 1/134309 349/123 |
| 2014/0152934 A1* | 6/2014 | Huh | G02F 1/133707 349/43 |
| 2014/0267994 A1 | 9/2014 | Jang et al. | |
| 2015/0227008 A1* | 8/2015 | Yoshida | G02F 1/133707 349/39 |
| 2016/0342009 A1* | 11/2016 | Zhong | G02F 1/1334 |

FOREIGN PATENT DOCUMENTS

| KR | 1020130091218 | 8/2013 |
|---|---|---|
| KR | 1020130102285 | 9/2013 |
| KR | 1020140109744 | 9/2014 |

* cited by examiner

*Primary Examiner* — Nathanael R Briggs
(74) *Attorney, Agent, or Firm* — Cantor Colburn LLP

(57) ABSTRACT

A liquid crystal display includes: a first panel including a first electrode; a second panel including a second electrode; and a liquid crystal layer between the first and second panels. The first electrode includes: a central electrode disposed in a central region of a pixel; an outer electrodes extending along a side of the central electrode; and a connection electrode which connects the outer electrode and the central electrode. A slit pattern is defined in the first electrode around the central electrode, and a liquid crystal control pattern is defined in the first electrode in a corner region of the pixel. Horizontal and vertical incisions, which divide the first electrode into a plurality of domains, are defined in the second electrode, an end portion of the outer electrode is disposed to correspond to the corner region, and the end portion of the outer electrode extends farther than the central electrode.

20 Claims, 16 Drawing Sheets

LIQUID CRYSTAL DISPLAY

This application claims priority to Korean Patent Application No. 10-2015-0095331 filed on Jul. 3, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display.

2. Description of the Related Art

A liquid crystal display is one of the most widely used types of flat panel display, and typically includes two display panels provided with field-generating electrodes such as a pixel electrode and a common electrode, and a liquid crystal layer disposed between the display panels. The liquid crystal display generates an electric field in the liquid crystal layer by applying a voltage to the field-generating electrode, determines the direction of the liquid crystal molecules in the liquid crystal layer through the electric field, and displays images by controlling the polarization of the incident light.

Among the liquid crystal displays, a vertical alignment mode liquid crystal display may include a plurality of domains based on the different alignment directions of the liquid crystal in one pixel to achieve a wide-viewing angle.

In a vertical alignment mode liquid crystal display, the plurality of domains may be defined by an incision, such as slit, defined in the field-generating electrode. In such a vertical alignment mode liquid crystal display, the liquid crystal is realigned by a fringe field formed between the edge of the incision and the field-generating electrode facing the incision, such that a plurality of domains may be provided.

In the vertical alignment mode liquid crystal display, the side visibility may be lower than the front visibility. Accordingly, a technique which divides the single pixel electrodes into two sub-pixel electrodes, applies a high voltage and a low voltage to each of the pixel electrodes, and sets the different alignment directions of the liquid crystal molecules of the two pixel electrodes to improve the visibility of the left and right viewing angle directions has been developed.

SUMMARY

In a vertical alignment mode liquid crystal display, when forming fine slits in the pixel electrode defining a plurality of branched electrodes, an aperture ratio of the liquid crystal display may decrease, and the controllability may be lowered at a corner region of the pixel electrode.

Exemplary embodiments of the invention provide a liquid crystal display in which transmittance and response speed are improved by improving the controllability of the liquid crystal molecules in the corner region of each pixel, while effectively minimizing a decrease in the aperture ratio.

According to embodiments of the invention, by providing a slit pattern for spacing the branch electrodes in an electrode of the pixel, visibility and transmittance may be substantially improved.

According to an exemplary embodiment of the invention, a liquid crystal display includes: a first panel including a first electrode; a second panel including a second electrode and disposed opposite to the first panel; and a liquid crystal layer including a liquid crystal and disposed between the first panel and the second panel. In such an embodiment, the first electrode includes: a central electrode disposed in a central region of a pixel; an outer electrodes extending along a side of the central electrode; and a connection electrode which connects the outer electrode and the central electrode. In such an embodiment, a slit pattern is defined in the first electrode around the central electrode and between the central electrode and the outer electrode, and a liquid crystal control pattern is defined in the first electrode in a corner region of the pixel. In such an embodiment, horizontal and vertical incisions, which divide the first electrode into a plurality of domains, are defined in the second electrode, an end portion of the outer electrode disposed adjacent to the liquid crystal control pattern is disposed to correspond to the corner region of the pixel, and the end portion of the outer electrode extends farther than a corresponding side of the central electrode.

In an exemplary embodiment, the outer electrode may include a first outer electrode disposed in a direction parallel to a horizontal side of the central electrode, and a second outer electrode disposed in a direction parallel to a vertical side of the central electrode, where at least one end portion of the first and second outer electrodes may be connected to the liquid crystal control pattern.

In an exemplary embodiment, the first electrode may further include a protruding electrode extending from the central electrode through the corner region of the pixel, and disposed between the first and second outer electrodes, wherein the liquid crystal control pattern is defined between the protruding electrode and the first or second outer electrode.

In an exemplary embodiment, the slit pattern may include a first slit pattern disposed parallel to the first outer electrode and between the first outer electrode and the central electrode, and a second slit pattern disposed parallel to the second outer electrode and between the second outer electrode and the central electrode, and an end portion of the first and second slit patterns may be in contact with the connection electrode, and another end portion of the first and second slit patterns is connected to the liquid crystal control pattern.

In an exemplary embodiment, widths of the first and second slit patterns and the first and second outer electrodes may be in a range of 4 micrometers (μm) to 8 μm.

In an exemplary embodiment, the liquid crystal control pattern may be disposed parallel to the first slit pattern or the second slit pattern, and the outer electrode may further include an extension electrode which extends from the first outer electrode or the second outer electrode to the corner region of the pixel.

In an exemplary embodiment, the first electrode may further include a plurality of branch electrodes extending from the central electrode in a predetermined direction toward the first and second slit patterns, and the slit pattern may further include a third slit pattern defined between the branch electrodes.

In an exemplary embodiment, extension directions of the branch electrodes in different domains may be different from each other.

In an exemplary embodiment, a pitch of the branch electrodes may be in a range of about 4 μm to about 8 μm.

In an exemplary embodiment, widths of the branch electrodes may be in a range of about 1 μm to about 5 μm.

In an exemplary embodiment, the extension directions of the branch electrodes in a domain and an average azimuth angle of the liquid crystal in the domain may be the same as each other.

In an exemplary embodiment, the liquid crystal display may further include: a first polarizing plate disposed on the first panel; and a second polarizing plates disposed on the second panel and having a polarization axis perpendicular to a polarization axis of the first polarizing plate, where the extension direction of the branch electrode forms an angle in a range of about 30° to about 60° with respect to the polarization axis of the first or second polarizing plate.

In an exemplary embodiment, widths of the branch electrodes and the first, second and third slit patterns may be substantially the same as each other.

In an exemplary embodiment, a width of the outer electrode may be in a range of about 1 µm to about 5 µm.

In an exemplary embodiment, widths of the horizontal and vertical incisions may be in a range of about 2 µm to about 5 µm.

In an exemplary embodiment, the horizontal and vertical incisions may extend farther than the outer electrode and is disposed to correspond to the connection electrode.

In an exemplary embodiment, a plurality of first electrodes may define a pixel, and an intermediate section is defined between two adjacent first electrodes in the pixel.

In an exemplary embodiment, the intermediate section may include a connection section which connects the outer electrode of one of the two adjacent first electrodes and the outer electrode of the other of the two adjacent first electrodes.

In an exemplary embodiment, the liquid crystal control pattern may provide an electric filed vector which controls the liquid crystal disposed in the corner region of the pixel and the liquid crystal control pattern in a regular direction.

In an exemplary embodiment, an average polar angle of the liquid crystal may be in a range of about 3.5° to about 4.5° and an average azimuth angle of the liquid crystal may be in a range of about 40° to about 45°.

Other features and exemplary embodiments will be apparent from the following detailed description, the drawings, and the claims.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
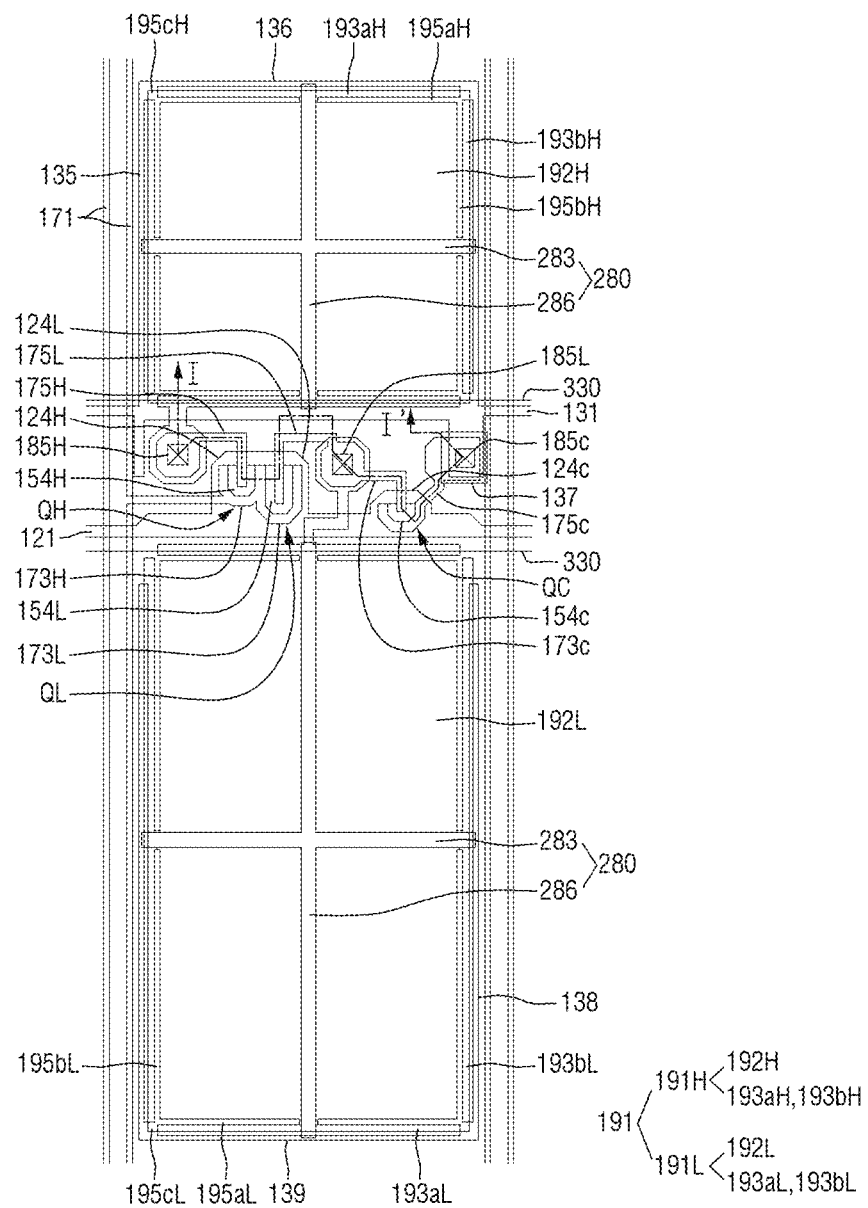
FIG. 1 is a schematic layout diagram of a pixel of a liquid crystal display according to an embodiment of the invention.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing.

The regions illustrated in the drawings are schematic in nature and their shapes are not intended to illustrate the actual shape of a region of a device and are not intended to be limiting.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

Embodiments of the invention will now be described with reference to the accompanying drawings.

Figure 2:
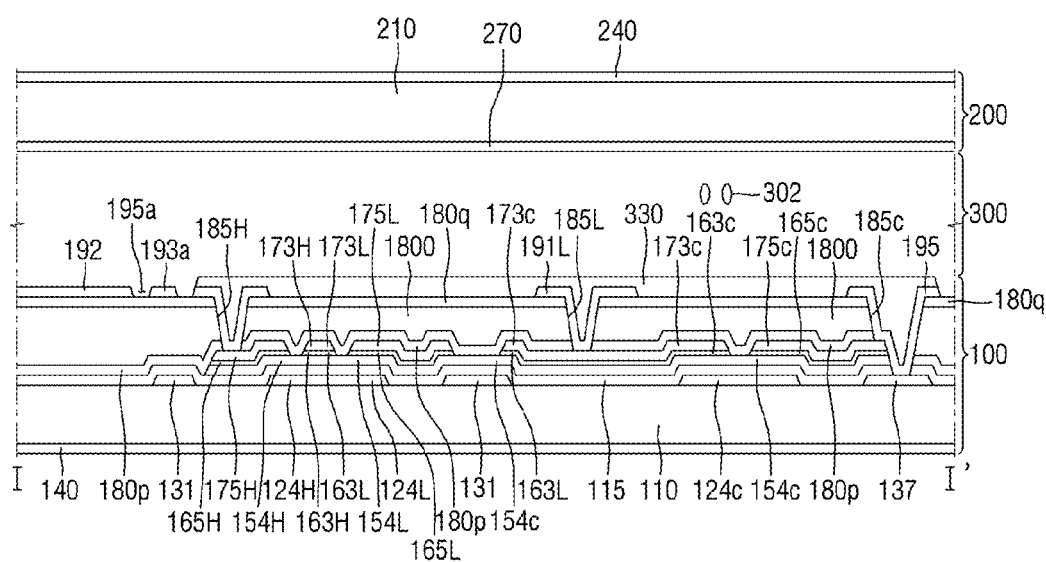
FIG. 2 is a schematic cross-sectional view taken along line I-I' of a liquid crystal display of FIG. 1.
Figure 3:
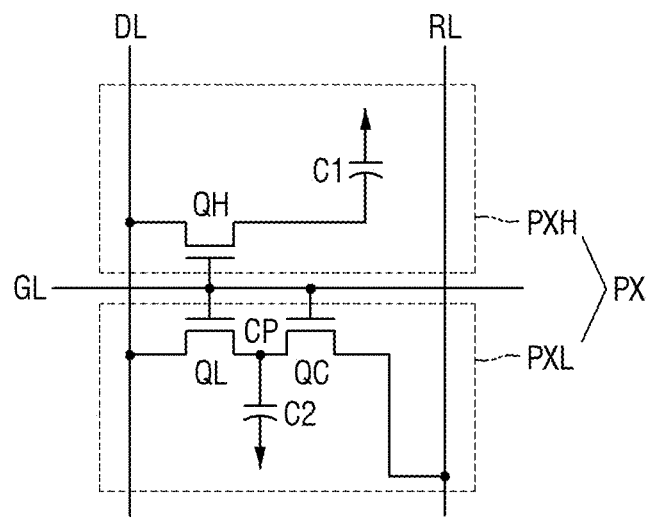
FIG. 3 is an equivalent circuit diagram of a pixel of the liquid crystal display according to an embodiment of the invention.
Figure 4:
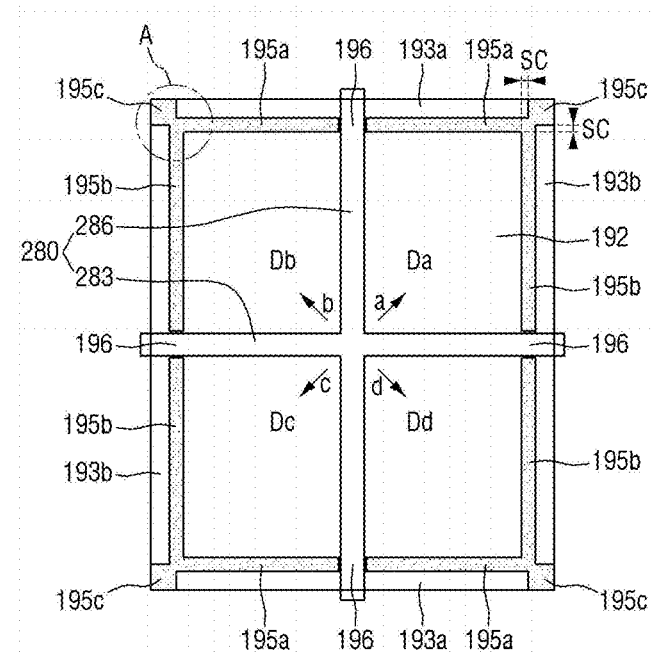
FIG. 4 is an enlarged layout diagram of one pixel according to an embodiment of the invention.

FIG. 1 is a schematic layout diagram of a pixel of a liquid crystal display according to an embodiment of the invention, FIG. 2 is a schematic cross-sectional view taken along line I-I' of a liquid crystal display of FIG. 1, FIG. 3 is an equivalent circuit diagram of a pixel of the liquid crystal display according to an embodiment of the invention, and FIG. 4 is an enlarged layout diagram of a pixel according to an embodiment of the invention.

Although FIGS. 1 to 4 illustrate only one pixel PX, and signal lines corresponding thereto, e.g., a gate line GL, a data line DL and a partial pressure base line RL, for the convenience of illustration, a plurality of pixels is aligned in a matrix form including rows and columns, and the pixels PX may be disposed near intersections between a plurality of gate lines 121 extending in a row direction and a plurality of data lines 171 extending in a column direction.

Referring to FIGS. 1 and 2, an exemplary embodiment of a liquid crystal display 1 includes a first panel 100, a second panel 200 disposed opposite to the first panel 100, and a liquid crystal layer 300 disposed between the first panel 100 and the second panel 200.

The first panel 100 may include a first substrate 110, a first electrode and a first alignment film sequentially located on one side, e.g., an upper side or an inner surface, of the first substrate 110, and a first polarizing plate 140 located on the other side, e.g., a lower side or an outer surface, of the first substrate 110. A first electrode disposed on the first panel 100 may be, for example, a pixel electrode 191.

A second panel 200 may include a second substrate 210, a second electrode and a second alignment film sequentially located on one surface, e.g., a lower side or an inner surface, of the second substrate 210, and a second polarizing plate 240 disposed on the other side, e.g., an upper side or an outer surface, of the second substrate 210. The second electrode disposed on the second panel 200 may be, for example, a common electrode 270.

In an alternative exemplary embodiment, one of the first polarizing plate 140 and the second polarizing plate 240 may be omitted. In an alternative exemplary embodiment, one or both of the first and second alignment films may be omitted.

The pixel PX may have an approximately rectangular shape. The pixel electrode 191 may be disposed to cover the pixel PX corresponding thereto. The common electrode 270 may be integrally disposed on the entire second panel 200.

In an exemplary embodiment, an incision 280 may be defined in a part of the common electrode 270, but not being limited thereto.

The first panel 100 or the second panel 200 may include a switching element (QH, QL, Qc), a color filter 1800, a light-blocking member 330 or the like.

The liquid crystal layer 300 may include a liquid crystal having a negative dielectric anisotropy or a liquid crystal having a positive dielectric anisotropy. Hereinafter, for convenience of description, exemplary embodiments in which the liquid crystal layer 300 has a liquid crystal having a negative dielectric anisotropy will be described, but not being limited thereto. In such an embodiment, when there is no electric field between the pixel electrode 191 and the common electrode 270, the longitudinal axes of the liquid crystal molecules 302 of the liquid crystal layer 300 may be aligned in a direction that is substantially perpendicular to a surface of the alignment film. When electric field is generated between the pixel electrode 191 and the common electrode 270, the longitudinal axes of the liquid crystal molecules 302 may be aligned to have a pre-tilt angle with respect to the thickness direction of the liquid crystal layer 300.

Hereinafter, the first panel 100 and the second pattern 200 will each be described in detail.

First, the first panel 100 may include a first substrate 110, a first switching element QH, a second switching element QL, a third switching element Qc, a gate line 121 electrically connected to the switching elements (QH, QL, Qc), a partial pressure base line 131, a data line 171 and a pixel electrode 191. The pixel electrode 191 includes a first sub-pixel electrode 191H and a second sub-pixel electrode 191L.

The partial pressure base line 131 may include first holding electrode lines 135 and 136, and a standard electrode 137. Although second holding electrode lines 138, 139 are not connected to the partial pressure base line 131 in the drawing, the second holding electrodes 138, 139 are disposed to overlap the second sub-pixel electrodes 191L.

In the first panel 100, a plurality of gate conductors is disposed on the first substrate 110, and the gate conductor includes a plurality of gate lines 121, the partial pressure base line 131 including a plurality of holding electrode line (135, 136, 138, 139). First, the first substrate 110 may include glass or plastic, such as soda lime glass or borosilicate glass, for example.

The gate line 121 and the partial pressure base line 131 may be disposed or extend in a same direction, e.g., in the horizontal direction, and the gate line 121 may transmit the gate signals. The gate line 121 may include a first gate electrode 124H and a second gate electrode 124L that partially protrude from the gate line 121 located between the first sub-pixel electrode 191H and the second sub-pixel electrodes 191L, and the gate line 121 may include a third gate electrode 124c which protrudes upward toward the first sub-pixel electrode 191H. In an exemplary embodiment, as shown in FIG. 1, the first gate electrode 124H and the second gate electrode 124L may be connected to each other by being defined by a same protrusion of the gate line 121.

The partial pressure base line 131 extends in the horizontal direction, and may transmit a predetermined voltage such as the common voltage. The partial pressure base line 131 may be connected to the first holding electrodes 135, 136, and the second holding electrodes 138, 139 extending downward.

In an exemplary embodiment, a first vertical holding electrode 135 of the first holding electrodes 135, 136 is disposed or extending along the vertical edge of the first pixel electrode 191H on the upper part, and a second vertical holding electrode 138 of the second holding electrodes 138, 139 may be disposed or extending along the vertical edge of the second pixel electrode 191L. In such an embodiment, each of first and second horizontal holding electrode sections 136,139 may be disposed along the horizontal edge of the first or second pixel electrode 191H or 191L.

As a result, the first vertical holding electrode 135 and the first horizontal holding electrode 136 are disposed along the edge of the first pixel electrode 191H to at least partially overlap the first pixel electrode 191H, and the second vertical holding electrode 138 and the second horizontal holding electrode 139 are disposed along the edge of the second pixel electrode 191L to at least partially overlap the second pixel electrode 191L.

Although the first horizontal holding electrode 136 located at the upper part and the second transverse holding electrode 139 located in the lower part are illustrated as being separated from each another in FIG. 1, in an exemplary embodiment, the two horizontal holding electrodes 136, 139 in the adjacent upper and lower pixels PX may be electrically connected to each other to surround each of the sub-pixel electrodes 191H, 191L of one pixel in a ring shape.

The gate line 121, the partial pressure base line 131 and the holding electrode lines (135, 136, 138, 139) include the same material as each other and may be disposed on or in the same layer as each other. The gate line 121, the partial pressure base line 131 and the holding electrode lines (135, 136, 138, 139) may include at least one selected from a aluminum-based metal such as aluminum (Al) and an aluminum alloy, a silver-based metal such as silver (Ag) and a silver alloy, a copper-based metal such as copper (Cu) and a copper alloy, a molybdenum-based metal such molybdenum (Mo) and a molybdenum alloy, chromium (Cr), titanium (Ti), and tantalum (Ta).

In such an embodiment, the gate line 121, the partial pressure base line 131 and the holding electrode lines (135, 136, 138, 139) may have a multi-layer structure or a multi-film structure that includes two conductive films (not illustrated) having the physical properties different from each other. In such an embodiment, one conductive film of the multi-film structure may include a metal of low specific resistance (resistivity) to reduce signal delay or voltage drop of the gate line 121, for example, an aluminum (Al)-based metal, a silver (Ag)-based metal, and a copper (Cu)-based metal.

The gate insulating film 115 may be disposed on the whole surface of the first substrate 110 on which the gate line 121, the partial pressure base line 131 and the holding electrode lines (135, 136, 138, 139) are disposed. The gate insulating film 115 may include silicon oxide (SiOx) or silicon nitride (SiNx).

The semiconductor layers (154H, 154L, 154c) may be disposed on the gate insulating film 115. The semiconductor layers (154H, 154L, 154c) may be disposed to at least partially overlap the gate electrodes (124H, 124L, 124C). In one exemplary embodiment, for example, the semiconductor layers (154H, 154L, 154c) may include a semiconductor oxide that contains amorphous silicon (a-silicon), polycrystalline silicon (poly-silicon), zinc oxide (ZnO) or the like.

A plurality of ohmic contacts (163H, 165H, 163L, 165L, 163c, 165c) may be disposed on the semiconductor layers (154H, 154L, 154c). In such an embodiment, the ohmic contacts (163H, 165H, 163L, 165L, 163c, 165c) may be disposed in the respective regions.

Over the ohmic contacts (163H, 165H, 163L, 165L, 163c, 165c) and the gate insulating film 115, a plurality of data lines 171 including the first source electrode 173H and the second source electrode 173L, and the data conductors including a first drain electrode 175H, a second drain electrode 175L, a third source electrode 173c and a third drain electrode 175c are disposed. In an exemplary embodiment, the data conductor, and the semiconductor and the ohmic contacts disposed below the data conductor may be provided or formed simultaneously using a single mask. In such an embodiment, the data line 171 includes a wide end portion (not illustrated) for contact with another layer or an external driving circuit.

A data conductive layer is disposed on the semiconductor layers (154H, 154L, 154c). The data conductive layer may include a data line 171 that extends vertically to intersect with the gate line 121.

The data line 171 transmits the data signals, and mainly extends in the vertical direction to intersect with the gate line 121 and the partial pressure base line 131. Each data line 171 extends toward the first gate electrode 124H and the second gate electrode 124L, and may include a first source electrode 173H and a second source electrode 173L connected to each other.

The data line 171 may include the first source electrode 173H and the second source electrode 173L connected to the data line 171, a first drain electrode 175H spaced apart to face the first source electrode 173L, a second drain electrode 175L spaced apart to face the second source electrode 173L, a third source electrode 173C electrically connected to the second drain electrode 175L, and a third drain electrode 175C spaced apart to face the third source electrode 173C.

The end portions of the first drain electrode 175H and the second drain electrode 175L are partially surrounded by the first source electrode 173H and the second source electrode 173L. A wide end portion of the second drain electrode 175L extends again to form a third source electrode 173c curved in a "U" shape. A wide end portion 177c of the third drain electrode 175c is superimposed with the reference electrode 137 and is connected to the third contact holes 185c, and the end portion is partially surrounded by the third source electrode 173c.

The semiconductor layers (154H, 154L, 154c) may be disposed in the substantially the same planar shape as the data conductors (171, 175H, 175L, 175c) and the lower ohmic contacts (164H, 164L, 164c), except the channel region between the source electrodes (173H, 173L, 173c) and the drain electrodes (175H, 175L, 175c). In such an embodiment, in the semiconductor layers (154H, 154L, 154c), there are portions that are exposed without being covered by the data conductors (171, 175H, 175L, 175c) including between the source electrodes (173H, 173L, 173c) and the drain electrodes (175H, 175L, 175c).

The data line 171 may come into direct contact with the semiconductor layers (154H, 154L, 154c) to form an ohmic contact, as described above. The data line 171 may have a single layer structure including a low resistance material to perform the role of ohmic contact with the semiconductor layers (154H, 154L, 154c). In one exemplary embodiment, for example, the data line 171 may include Cu, Al or Ag.

In an exemplary embodiment, to improve the ohmic contact characteristics with the semiconductor layers (154H, 154L, 154c), the data line 171 may have a single film structure or a multi-film structure including Ni, Co, Ti, Ag, Cu, Mo, Al, Be, Nb, Au, Fe, Se or Ta. In one exemplary embodiment, for example, the multi-film structure may include a double film such as Ta/Al, Ta/Al, Ni/Al, Co/Al, Mo (Mo alloy)/Cu, Mo (Mo alloy)/Cu, Ti (Ti alloy)/Cu, TiN (TiN alloy)/Cu, Ta (Ta alloy)/Cu or TiOx/Cu or a triple film such as Ti/Al/Ti, Ta/Al/Ta, Ti/Al/TiN, Ta/Al/TaN, Ni/Al/Ni or Co/Al/Co.

In such an embodiment, the first/second/third gate electrodes (124H/124L/124*c*), the first/second/third source electrodes (173H/173L/173*c*), the first/second/third drain electrodes (175H/175L/175*c*), and the first/second/third semiconductors (154H/154L/154*c*) collectively defined the first/second/third thin film transistors (QH/QL/Qc), respectively, and the channel of the thin film transistor may be formed in each of the semiconductor layers (154H/154L/154*c*) between the respective source electrodes (173H/173L/173*c*) and the respective drain electrodes (175H/175L/175*c*).

A protective film 180 may be disposed on the data conductors (171, 175H, 175L, 175*c*) and the exposed semiconductor layers (154H, 154L, 154*c*). The protective film 180 may have a single film structure including an inorganic film or an organic film. In an alternative exemplary embodiment, the protective film 180 may have a double film structure of a lower inorganic layer and an upper organic film may be included to protect the semiconductor layers (154H, 154L, 154*c*). In another alternative exemplary embodiment, the protective film 180 may have a triple film having a lower inorganic film, an organic film over the inorganic film and another inorganic film over the organic film may be formed. In such an embodiment, a color filter may define the organic film used in the protective film 180.

In one exemplary embodiment, for example, a lower protective film 180*p* including an inorganic insulating material such as silicon nitride or silicon oxide may be disposed on the data conductors (171, 175H, 175L, 175*c*) and the exposed portion of the semiconductors (154H, 154L, 154*c*).

An organic film may be disposed on the lower protective film 180*p* as a protective film. In an exemplary embodiment, a color filter 180O may be used as such an organic film. The color filter 180O is disposed to extend longitudinally in the vertical direction along between the adjacent data lines 171, each color filter 180O may display one of primary color such as three primary colors of red, green and blue, and the respective color filters 180O may be disposed to overlap each other over the data line 171.

An upper protective film 180*q* may be disposed on the color filter 180O and an exposed portion of the lower protective film 180*p* through an opening. The upper protective film 180*q* effectively prevents the separation of the color filter 180O, suppresses the contamination of the liquid crystal layer 300 due to an organic matter such as solvent flowing from the color filter 180O, and may effectively prevent defects such as a residual image that may be caused during startup of the screen. The upper protective film 180*q* may include an inorganic insulating material such as silicon nitride or silicon oxide, or an organic material, for example.

A first contact hole 185H and a second contact hole 185L which expose each of the end portion of the first drain electrode 175H and the end portion of the second drain electrode 175L may be defined in the lower protective film 180*p*, the color filter 180O and the upper protective film 180*q*.

A plurality of pixel electrodes 191 is disposed on the upper protective film 180*q*. The pixel electrodes 191 may be connected to first drain electrode 175H and the second drain electrode 175L through the first contact hole 185H and the second contact hole 185L. The pixel electrode 191 may include a transparent conductor such as indium tin oxide ("ITO") or indium zinc oxide ("IZO"). The pixel electrode 191 generates an electric field in a common electrode 270 disposed on the second panel 200 by the voltage transmitted through the first drain electrode 175H and the second drain electrode 175L to which the data voltage is applied, to rotate the liquid crystal molecules 302 of the liquid crystal layer 300 disposed between the first panel 100 and the second panel 200.

The data voltage may be applied to the pixel electrode 191 through the thin film transistors Q controlled by the gate signal. In an exemplary embodiment, the first sub-pixel electrode 191H and the second sub-pixel electrode 191L disposed as illustrated in FIG. 1 are connected to the first drain electrode 175H and the second drain electrode 175L, respectively, through the first contact hole 185H and the second contact hole 185L, and may receive the data voltage from the first drain electrode 175H and the second drain electrode 175L.

Each of the pixel electrodes 191 may be disposed in the corresponding pixel PX, which may be defined by the corresponding gate line 121 and the corresponding data lines 171, but not being limited thereto.

The pixel electrodes 191 are separated or spaced apart from each other with the gate line 121 interposed therebetween, and may include a first sub-pixel electrode 191H and a second sub-pixel electrode 191L that are disposed above and below a pixel region of the corresponding pixel and are adjacent to each other in the direction of the column.

In such an embodiment, where a pixel PX includes the first sub-pixel electrode 191H and the second sub-pixel electrode 191L, the viewing angle may be improved. The pixel electrode 191 will be described later in detail with reference to FIG. 4.

In an exemplary embodiment, the second panel 200 includes a second substrate 210 and a common electrode 270 positioned to face the first substrate 110. The common electrode 270 may be disposed on the second substrate 210 including a transparent glass or plastic, for example.

In an alternative exemplary embodiment, the light-blocking member 330 and the color filter 180O, described above as being disposed on the first panel 100, may be selectively disposed in the second panel 200. The light blocking member, the color filter, the overcoat film and the second alignment film may be selectively disposed on the second substrate 210. Herein, for convenience of description, an exemplary embodiment, in which the color filter and the light-blocking member are disposed on the first panel 100, will be described.

In such an embodiment, where the color filter 180O and the light-blocking member 330 are disposed on the first substrate 110, a misalignment when being used in a curved display or the like may be effectively prevented, and it is possible to prevent a disclination line problems in which misalignment of the liquid crystal alignment occurs when determining the alignment direction as in the second alignment film.

An alignment relationship in an exemplary embodiment where the light-blocking member, the color filter, the overcoat film and the second alignment film are selectively disposed on the second substrate 210 will be briefly described. The color filters of a plurality of colors may be disposed on the second substrate 210, and the light-blocking member may be disposed on the boundary of the plurality of color filters. The color filters serve as filters which transmit the color of a specific wavelength, and the light-blocking member is also called a black matrix, may effectively prevent light leakage and color mixing of the color filters.

In an exemplary embodiment, an overcoat film and the second alignment film may be selectively disposed on the second panel 200. The overcoat film may be disposed on the entire surface of the second substrate on which the color filter and the light blocking member are disposed. The overcoat film may include or be made of an insulating material, and may provide a flat surface. Alternatively, the overcoat film may be omitted.

The common electrode 270 may be disposed on the overcoat film. Further, the second alignment film may be disposed on the common electrode 270, and the second alignment film may be a vertical alignment film. Alternatively, the second alignment film may be omitted.

The operation of exemplary embodiments of the liquid crystal display described above will now be described referring to FIG. 3. One pixel PX of the liquid crystal display 1 according to an exemplary embodiment of the invention may include a first switching element QH, a second switching element QL and a third switching element Qc that may be a thin film transistor, and a first liquid crystal capacitor C1 and a second liquid crystal capacitor C2 that may include a dielectric defined by the liquid crystal layer 300.

The sources of the first switching element QH and the second switching element QL, that is, the input terminals, are connected to the data line DL, and gates of the first switching element QH and the second switching element QL, i.e., the control terminals, are connected to the gate line GL, and the gate of the third switching element Qc, i.e., the control terminal is connected to the gate line GL.

A connection point CP between the drain of the second switching element QL and the source of the third switching element Qc may be connected to the second sub-pixel electrode 191L of the second liquid crystal capacitor C2, and the drain of the first switching element QH, i.e., the output terminal may be connected to the first sub-pixel electrode 191H of the first liquid crystal capacitor C1. The other ends of the first and second liquid crystal capacitors (C1, C2) may be connected to the common electrode 270. The drain of the third switching element Qc, i.e., the output terminal is connected to the holding electrode line 131. The second sub-pixel electrode 191L is electrically connected to the partial pressure base line RL through the third switching element Qc.

When the gate-on signal Von is applied to the gate line GL, the first switching element QH, the second switching element QL and the third switching element Qc connected thereto may be turned on. Therefore, the data voltage applied to the data line DL is applied to the first sub-pixel electrode 191H through the first switching element QH that is turned on. In such an embodiment, the voltage applied to the second sub-pixel electrode 191L may be divided through the third switching element Qc that is connected in series to the second switching element QL. Therefore, the voltage applied to the sub-pixel electrode 191L may be lower than the voltage applied to the first sub-pixel electrode 191H.

Accordingly, in such an embodiment, the voltage charged to the first liquid crystal capacitor C1 may be different from the voltage charged to the second liquid crystal capacitor C2. Since the voltage charged to the first liquid crystal capacitor C1 is different from the voltage charged to the second liquid crystal capacitor C2, the inclination angles of the liquid crystal molecules are different from one another in the first sub-pixel PXH and the second sub-pixel PXL, and thus, brightness of the two sub-pixels may be different from each other.

Therefore, when the voltage charged to the first liquid crystal capacitor C1 and the voltage of the second liquid crystal capacitor C2 are suitably adjusted, the image viewed from the side surface may become substantially close to the image viewed from the front as much as possible, thereby improving the side visibility of the liquid crystal display 1.

In such an embodiment, to allow the voltage charged to the first liquid crystal capacitor C1 different from the voltage charged to the second liquid crystal capacitor C2, the third switching element Qc connected to the second liquid crystal capacitor C2 and the partial pressure base line RL are included. However, in an alternative exemplary embodiment of the liquid crystal display, the second liquid crystal capacitor C2 may also be connected to a step-down condenser.

In such an embodiment, by including the third switching element that includes the first terminal connected to the step-down gate line, the second terminal connected to the second liquid crystal capacitor C2 and the third terminal connected to the step-down condenser so that a part of the amount of charge charged to the second liquid crystal capacitor C2 is charged to the step-down condenser, the different charging voltages between the first liquid crystal capacitor C1 and the second liquid crystal capacitor C2 may be set. In another alternative exemplary embodiment of a liquid crystal display, the first liquid crystal capacitor C1 and the second liquid crystal capacitor C2 are connected to data lines different from each other so that the first liquid crystal capacitor C1 and the second liquid crystal capacitor C receive the data voltages different from each other, the different charging voltages may be set between the first liquid crystal capacitor C1 and the second liquid crystal capacitor C2. Alternatively, by some other methods, the different charging voltages many be set between the first liquid crystal capacitor C1 and the second liquid crystal capacitor C2.

Hereinafter, the pixel PX will be described in detail referring to FIG. 4. In an exemplary embodiment, the pixel PX may have an approximately rectangular shape, the pixel electrode 191 may be disposed to cover the pixel PX in accordance with the pixel PX, and the common electrode 270 facing the pixel electrode 191 may include an incision 280.

Thus, when forming an electric field in the liquid crystal layer 300 while giving a potential difference between the pixel electrode 191 and the common electrode 270 disposed in the first panel 100 and the second panel 200, the major or longitudinal axes of the liquid crystal molecules 302 of the liquid crystal layer 300 disposed between the first panel 100 and the second panel 200 may be aligned in a direction perpendicular to the electric field. Depending on the degree of inclination of the liquid crystal molecules 302, a degree of change of polarization of the incident light to the liquid crystal layer 300 may change. The change in polarization appears as a change in transmittance of the first second polarizing plates 140, 240, and the liquid crystal display 1 may display the image therethrough.

In an exemplary embodiment, a plurality of domains may be defined by the pattern on the pixel electrode 191 and the common electrode 270, to improve the viewing angle of the liquid crystal display 1 that displays an image.

In one exemplary embodiment, for example, the pixel electrode 191 includes a plurality of slit patterns (195*a*, 195*b*, 195*c*), and the slit patterns (195*a*, 195*b*, 195*c*) and the incision 280 in the common electrode 270 serve to adjust the direction of the electric field. In such an embodiment, since the pixel electrode 191 and the common electrode 270 are patterned, in one pixel PX, the liquid crystal molecules 302 having the different average liquid crystal azimuth angles may be divided into a plurality of domains L having different directions from each other.

The pixel PX may include four domains having a horizontal incision 283 and a vertical incision 286 of the common electrode 270 as boundaries therebetween, that is, first to fourth domains (Da, Db, Dc, Dd). The width of the incision 280 including the horizontal incision 283 and the vertical incision 286 may be in a range of about 2 micrometers (μm) to about 5 μm. In such an embodiment, the width of the incision 280 may be adjusted to improve the liquid crystal control force.

In such an embodiment, where the width of the incision 280 is in the range of about 2 μm to about 5 μm, the visibility may be improved without a reduction in transmittance of the pixel PX. When the width of the incision 280 is about 5 μm or less, an excessive increase of the fringe field at the boundary between the first and fourth domains (Da, Dd) and the second and third domains (Db, Dc) is effectively prevented, and thus, it is possible to minimize reductions in visibility and transmittance. Furthermore, when the width of the incision 280 is about 5 μm or less, the liquid crystal molecules do not lie on the region in which the incisions 280 are disposed, and thus, it is also possible to reduce a decrease in aperture ratio.

An open section may be defined in the region A in which the where the horizontal incision 283 and the vertical incision 286 intersect with each other. The open section may have a width greater than the widths of the horizontal and vertical incisions 283, 286. In such an embodiment, to adjust the intensity of the internal electric field of the pixel PX, the open section may a width that increases as it goes from the edge region of the pixel PX to the open section region.

The first to fourth domains (Da to Dd) may be divided in the pixel electrode 191 by horizontal and vertical incisions 283, 286 of the common electrode 270.

The pixel electrode 191 may include a central electrode 192 disposed in a central region of the pixel PX. The first sub-pixel electrode 191H and the second sub-pixel electrode 191L may include a first central electrode 192H and a second central electrode 192L, respectively. The central electrode 192, for example, may be a rectangular electrode. The pixel electrode 191 may include outer electrodes 193a, 193b that are disposed adjacent to at least one rectangular side region of the central electrode 192, that is, the edge region of the pixel PX, and a connection electrode 196 that connects the outer electrodes 193a, 193b and the central electrode 192. The first sub-pixel electrode 191H and the second sub-pixel electrode 191L may include first outer electrodes 193aH, 193bH, and second outer electrodes 193aL, 193bL, respectively.

The outer electrode 193 may include a first outer electrode 193a disposed parallel to the horizontal side of the rectangular central electrode 192, and a second outer electrode 193b disposed in a direction parallel to the vertical side of the central electrode 192.

The first panel 100 including the pixel electrode 191 as described above may include a second slit pattern 195b defined by a removed portion of the pixel electrode 191 between the both sides of the central electrode 193 of the pixel X and the second outer electrode 193b, and a first slit pattern 195b defined by a removed portion of the first pixel electrode 191 between the upper/lower sides of the central electrode 192 and the first outer electrode 193a. A liquid crystal control pattern 195c defined by overlapping ends of the first and second outer electrodes 193a, 193b may be in the corner region of the pixel PX. The first and second slit patterns 195a, 195b and the liquid crystal control pattern 195c may be defined or formed by removing a part of the electrode to expose the insulating layer disposed below the pixel electrode 191.

The central electrode 192 and the first and second outer electrodes 193a, 193b may be spaced apart from each other by the first and second slit patterns 195a, 195b and may be partially connected to one another by the connection electrode 196. In one exemplary embodiment, for example, one end portion of the first slit pattern 195a is in contact with the connection electrode 196, and the other end portion may be connected to the end portion of the second slit pattern 195b, as shown in FIG. 4.

The first panel 100 may include a liquid crystal control pattern 195c, in which the pixel electrode 191 is removed in the end regions of the first and second outer electrodes 193a, 193b, that is, in the corner region of the pixel PX. One end portion of the first outer electrode 193a is disposed adjacent to one end portion of the second outer electrode 193b, and the end portion of the first outer electrode 193a may be spaced apart from the end portion of the second suburbs electrode 193b due to the liquid crystal control pattern 195c. The liquid crystal control pattern 195c may be disposed by being connected to the end portions of the first and second slit patterns 195a, 195b.

The horizontal end portion of the corner region of the central electrode 192 and the horizontal end portion of the first outer electrode 193a may not be aligned with each other to form a step SC. In an exemplary embodiment, the horizontal end portion of the corner region of the central electrode 192 and the horizontal end portion of the second outer electrode 193b may not be aligned with each other to form a step SC. The end portion of the first outer electrode 193a or the second outer electrode 193b may extend farther than the corresponding side or the end portion of the corner region of the adjacent central electrode 192. This will be described in greater detail below while describing the behavior of the liquid crystal molecules 302 near the liquid crystal control pattern 195c.

In such an embodiment, in the region 'A' illustrated in FIG. 4, the end portion of the second outer electrode 193b is disposed to further extend than the horizontal side of the central electrode 192. The end portion of the first outer electrode 193a is disposed to further extend than the vertical side of the central electrode 192.

Alternatively, the end portions of the first and second outer electrodes 193a, 193b may be disposed to effectively extend by slightly rounding the corner region of the central electrode 192, to facilitate the arrangement of the first and second outer electrodes 193a, 193b to further extend than the end portion of the central electrode 192 as in the region A. This will be described below in detail while describing the behavior of the liquid crystal in the region A.

Each width of the first and second outer electrodes 193a, 193b may be disposed in a range of about 1 μm to about 5 μm. In one exemplary embodiment, for example, each width of the first and second outer electrodes 193a, 193b may be disposed in a range of about 2 μm to about 4 μm.

The first and second slit patterns 195a, 195b and the first and second outer electrodes 193a, 193b may be disposed in a range of about 4 μm to about 8 μm. In one exemplary embodiment, for example, the first and second slit patterns 195a, 195b and the first and second outer electrodes 193a, 193b may be disposed in a range of about 5 μm to about 7 μm.

In such an embodiment, as described above, if the liquid crystal molecule 302 having an alignment direction obtained by averaging the alignment directions of the liquid crystal molecules 302 is assumed to be an average liquid crystal azimuth angle 310 in each of the domains (Da, Db, Dc, Dd) formed as above, the average liquid crystal azimuth angle 310 may lie in a direction of the electric field vector due to the electric field of the domains (Da, Db, Dc, Dd) and the electric field vector due to the liquid crystal collision under the influence of the electric field.

In such an embodiment, the liquid crystal molecules 302 may be formed at an azimuth angle similar to the extending direction of the corner region of the pixel PX at the intersection of the horizontal and vertical incisions 283, 286. In each of the domains (Da, Db, Dc, Dd), the liquid crystal molecules 302 may be aligned to have an average liquid crystal azimuth angle 310 of the direction indicated by arrows (a, b, c, d) when viewed from a plan view, as shown in FIG. 4.

In such an embodiment, the liquid crystal molecules 302 may be disposed in a direction substantially parallel to the direction toward the central portion of the incision 280 of the cross-shaped common electrode 270 from the four parts in which the edges extending in the different directions of the pixel electrodes 191 meet one another.

Therefore, in such an embodiment of the liquid crystal molecule 302, the alignment of the directors of the liquid crystal molecules 302 due to the influence of the electric field in each of the domains (Da, Db, Dc, Dd) may be set in a way such that the inclined directions of the liquid crystal molecules 302 in each region of the field-forming electrode may be total four directions.

Accordingly, in such an embodiment of the invention, the regions divided into the horizontal and vertical incision 283, 286 of the common electrode 270 of one pixel PX are total four regions, and the directions of the electric field provided by the field-forming electrode in each domain (Da to Dd) are four directions. Accordingly, the inclined directions of the liquid crystal molecules 310 in one pixel PX may also be total four directions. In such an embodiment, when setting the various inclined directions of the liquid crystal molecules 310, the reference viewing angle of the liquid crystal display 1 may increase.

Figure 5:
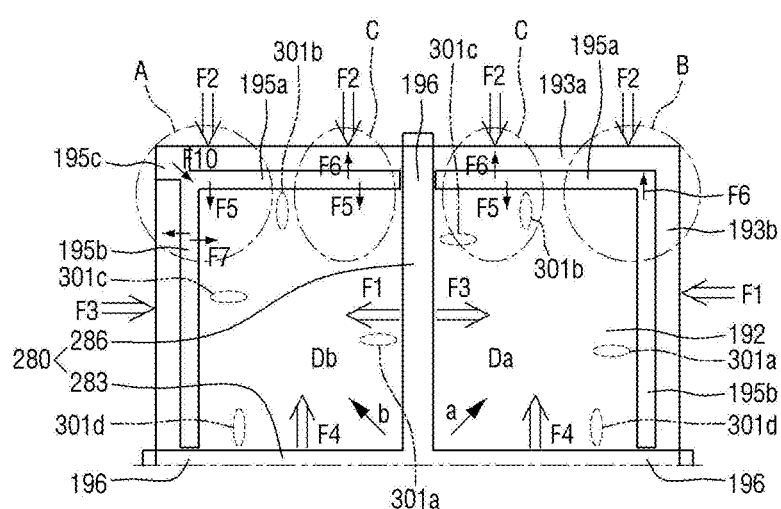
FIG. 5 is a plan view illustrating a field-forming direction in the pixel of the liquid crystal display according to an embodiment of the invention.
Figure 6:
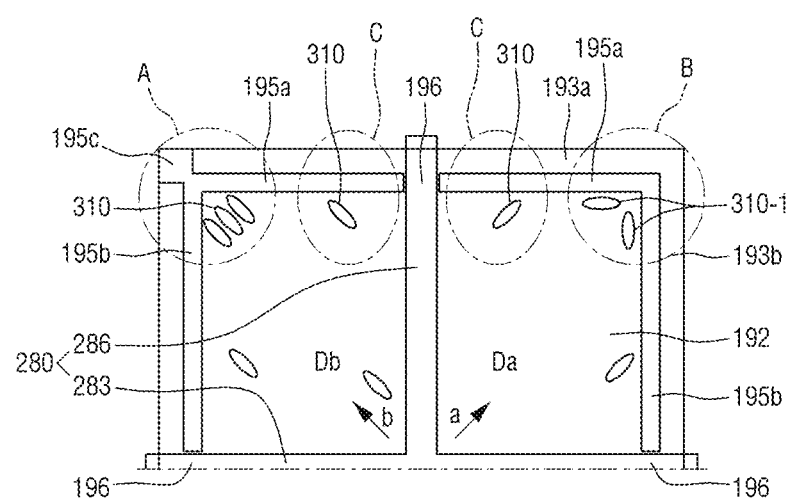
FIG. 6 is a plan view illustrating an alignment of the liquid crystal in the pixel of the liquid crystal display according to an embodiment of the invention.
Figure 7:
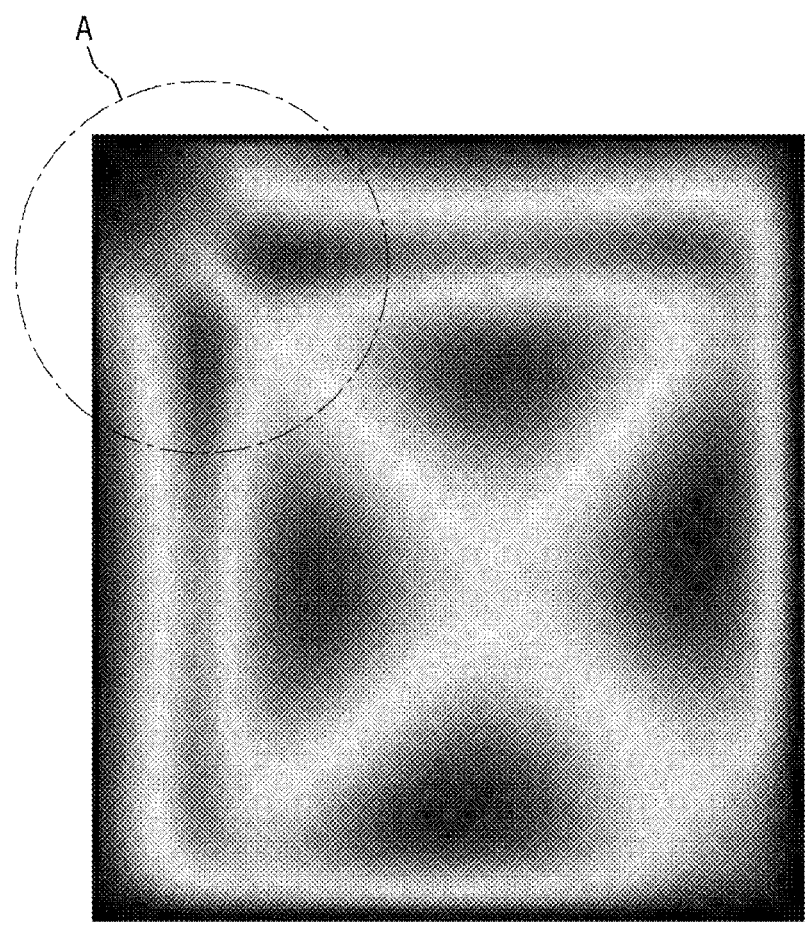
FIGS. 7 and 8 are photographs obtained by capturing a part of the pixel of the liquid crystal display according to FIGS. 5 and 6.
Figure 8:
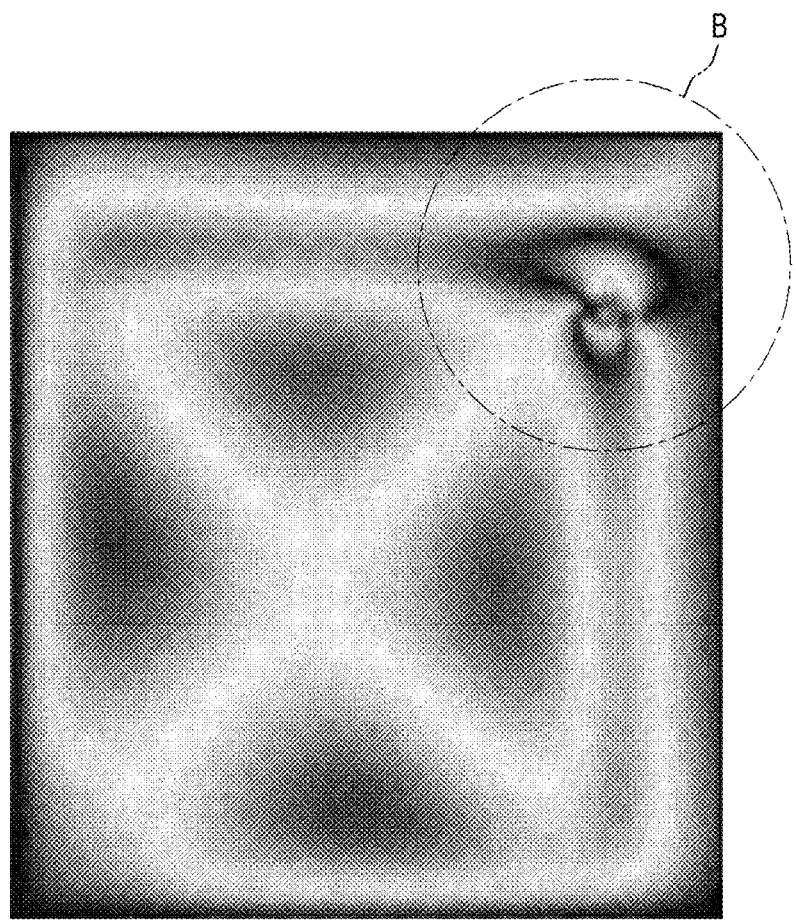

FIG. 5 is a plan view illustrating the field-forming direction in the pixel of the liquid crystal display according to an embodiment of the invention, FIG. 6 is a plan view illustrating the alignment of the liquid crystal in the pixel of the liquid crystal display according to an embodiment of the invention, and FIGS. 7 and 8 are photographs obtained by capturing a part of the pixel of the liquid crystal display according to FIGS. 5 and 6.

In FIGS. 5 and 6, a left side illustrates a plan view of the pixel X in which the liquid crystal control pattern 195c is disposed in the liquid crystal display 1 according to the invention, and a right side illustrates a plan view of a comparative embodiment the pixel PX in which the liquid crystal control pattern 195c is not defined. Here, FIGS. 5 and 6 illustrate only a partial domain region of the pixel PX to show the behavior of the liquid crystal.

First, an exemplary embodiment of the liquid crystal display 1 according to the invention may embody a gradation by changing the refractive index of the liquid crystal, while the behavior of the liquid crystal molecules 302 changes as a voltage is applied between the pixel electrode 191 and the common electrode 270.

The exemplary embodiment of the liquid crystal display 1 may exhibit a high contrast ratio by the high dark characteristics, and meanwhile, since it uses the negative liquid crystal, the transmittance of the liquid crystal due to the behavior of the liquid crystal molecules 302 may significantly change depending on the viewing directions. That is, the transmittance of the liquid crystal display 1 differs depending on the viewing directions such that the viewing angle characteristics may be degraded.

To improve the viewing angle characteristics of the liquid crystal display 1, as described in FIGS. 1 and 2, a plurality of domains (multi-domain) regions may be defined to change the behavior directions of the liquid crystal molecules 302, by providing the electrode pattern in each of the first panel 100 and the second panel 200. The electrode pattern, for example, may be the pixel electrode 191 or the common electrode 270.

Thus, in such an embodiment, it is possible to improve the visibility by forming a plurality of domains (Da to Dd) to minimize the refractive index difference of the liquid crystal due to the viewing angle direction. However, the refractive index difference of the liquid crystal due to the viewing angle direction is minimized by using the plurality of domain (Da to Dd) structures, a gradation curve distortion on the sides may still exist.

The reason is that the plurality of domain (Da to Dd) structures may have a problem in which the light efficiency is lowered at the side of the pixel X due to the disclination line. The reason is that when embodying a bright state and a dark state, some liquid crystal molecules 302 behave in a direction consistent with the polarizing axes of the polarizing plates 140, 240, and the disclination line may occur.

To improve the above-described problems, as described in FIGS. 1 and 2, the distortion of the gradation curve at a low gradation section (the dark state) and a high gradation section (the bright state) may be reduced by changing the patterns of the pixel electrode 191 and the common electrode 270. Further, it is possible to improve the visibility, by reducing the difference in transmittance at the time of the high gradation and the low gradation to minimize the distortion of the gamma curve.

Hereinafter, the behavior of the liquid crystal molecules for minimizing the distortion of the gamma curve will be described in detail.

The behavior of the liquid crystal molecules 302 in the pixel PX and the formation direction of the electric field will be described referring to FIGS. 5 and 6. An electric field may be formed in the liquid crystal layer 300 between the two field-forming electrodes, by applying a data voltage to the pixel electrodes 191 and applying a common voltage to the common electrode 270.

The fringe fields (F1 to F4) generated by the incision 280 of the common electrode 270 and the pixel electrode 191 may be formed in the liquid crystal molecules 302 of the liquid crystal layer 300 in response to the electric field. Hereinafter, a horizontal electric field component in the first direction that allows the liquid crystal molecules 302 to behave by the fringe field is referred to as a first horizontal electric field F1, a horizontal electric field component in the second direction is referred to as a second horizontal electric field F2, a third horizontal electric field component in the third direction is referred to as a third horizontal electric field F3, and a horizontal electric field component in the fourth direction is referred to as a fourth horizontal electric field F4. Here, the formation direction of the fringe field is set to a counter-clockwise direction, the electric field directed to the interior of the pixel PX from the right side is referred to as the first horizontal electric field F1, the electric field directed to the interior of the pixel X from the upper side is referred to as the second horizontal electric field F2, the electric filed directed to the interior of the pixel PX from the left side is referred to as the third horizontal electric field F3, and the electric field directed to the interior of the pixel X from the lower side is referred to as the fourth horizontal electric field F4. Even in the region in which the substantially different electric fields are formed, the direction is manly illustrated, and the same directions will be described by the same reference numerals.

First, in a comparative embodiment illustrated in the right side of FIG. 5, directors 301a, 301b of the liquid crystal molecules 302 due to the first and second horizontal electric fields (F1, F2) formed in the inward direction of the pixel PX from the two edge sides of the pixel PX, and directors 301c, 301d of the liquid crystal molecules due to the third and fourth horizontal electric fields (F3, F4) formed in the inward direction of the pixel PX from the incision 280 of the cross-shaped common electrode 270 may be inclined substantially parallel to the polarization axes of the polarizing plate 140, 240. That is, the directions in which the liquid crystal molecules 302 are inclined in one on the left side may be total four directions. Further, since the liquid crystal of the exemplary embodiment of the invention on the left side primarily behaves in the same direction as in the comparative embodiment.

More specifically, the first and second directors 301a, 301b of the liquid crystal molecules 302 in the portion adjacent to the edge of the pixel electrode 191 in one pixel PX may be perpendicular to the edge of the pixel electrode 191, respectively. Moreover, the third and fourth directors 301c, 301d of the liquid crystal molecules 302 in the portion adjacent to the incision 280 of the common electrode 270 in one pixel PX may be perpendicular to the edge of the incision 280 of the common electrode 270, respectively.

Thus, the edge of the pixel electrode 191 in one pixel PX, and the first to fourth directors (301a, 301b, 301c, 301d) of the liquid crystal molecules 302 according to the fringe field formed by the incision 280 of the common electrode 270 may be primarily determined. Thus, the liquid crystal molecules 302 that primarily behave in a direction substantially parallel to polarization axes of the polarizing plate 140, 240 by the fringe fields (F1 to F4) formed by the electrodes may be formed by the first to fourth directors (301a, 301b, 301c, 301d).

The liquid crystal molecules 302 which behave by the first to fourth directors (301a, 301b, 301c, 301d) meet one another in the interior of pixel PX and may be secondarily aligned in a direction in which the deformation is minimized. Here, the secondary alignment direction of the first to fourth directors (301a, 301b, 301c, 301d) may be a vector sum direction of the directions to which the respective directions are directed.

Therefore, the direction in which the liquid crystal molecules 302 behave in the vector sum direction of the directions to which the respective directors are directed is the direction similar to a, b, c, d illustrated in FIG. 4 in the respective domains (Da, Db, Dc, Dd), and the average liquid crystal azimuth angle 310 may be formed. That is, the liquid crystal molecules 302 may be aligned in the pixel PX to have the different average liquid crystal azimuth angles 310 within the respective domains (Da, Db, Dc, Dd).

As described above, it is possible to dispose the different average liquid crystal azimuth angle 310 within each of the domains (Da, Db, Dc, Dd) by the behavior of the liquid crystal molecule 302.

Referring back to FIG. 4, in the first domain Da of the pixel PX, the alignment of the directors of the liquid crystal molecules 302 is obliquely disposed in a right upper direction of the horizontal incision 283 to form an average liquid crystal azimuth angle 310 in a direction of a.

In the second domain Db of the pixel PX, the alignment of the directors of the liquid crystal molecules 302 is obliquely disposed in a left upper direction of the horizontal incision 283 to form an average liquid crystal azimuth angle 310 in the direction of b.

In the third domain Dc of the pixel PX, the alignment of the directors of the liquid crystal molecules 302 is obliquely disposed in a left lower direction of the horizontal incision 283 to form an average liquid crystal azimuth angle 310 in the direction of c.

In the fourth domain Dd of the pixel PX, the alignment of the directors of the liquid crystal molecules 302 is obliquely disposed in a right lower direction of the horizontal incision 283 to form an average liquid crystal azimuth angle 310 in the direction of d.

Therefore, the plurality of domains is defined to have the different alignment directions of the liquid crystal, such that the side visibility of the liquid crystal display 1 is improved in an exemplary embodiment of the invention.

Referring now to FIGS. 5 and 6, the different electric fields may be formed in the region A, the region B and the region C depending on the presence or absence of the liquid crystal control pattern 195c.

First, in the region C, the first outer electrode 193a and the central electrode 192 are disposed with the first slit pattern 195a interposed therebetween, and the fifth horizontal electric field F5 directed toward the interior of the pixel PX may be formed. In such an embodiment, the sixth horizontal electric field F6 in the opposite direction to the fifth horizontal electric field F5 may be formed. Thus, the liquid crystal molecules 302 behaving due to the electric field formed in the incision 280 and the liquid crystal molecules 302 behaving by the fifth horizontal electric field F5 collide with each other in the region C, and the liquid crystal molecules may be aligned in the direction similar to the average liquid crystal azimuth angle 310.

In an exemplary embodiment, in the region B, the second horizontal electric field F2 and the sixth horizontal electric field F6 may be formed at the edge of the pixel PX in the inward direction of the pixel PX. Since the central electrode 192 corresponding to the first and second outer electrodes 193a, 193b are not disposed in the regions of the first slit pattern 195a and the second slit pattern 195b, the electric field corresponding to the sixth horizontal electric field F6, for example, the electric field similar to the fifth horizontal electric field F5 may not be formed. That is, the electric field similar to the fifth horizontal electric field F5 formed toward the interior of the pixel PX may not be formed in the region C.

Therefore, since the liquid crystal molecules 302 that collide with one another due to the formed electric field are not present in the region B, the liquid crystal molecules 310-1 having an irregular alignment may exist. Thus, the initial response speed may increases and the transmittance may be lowered in the region B due to the liquid crystal molecules 310-1 having the irregular alignment.

In an exemplary embodiment of the invention, in the A region, the ends of the first and second outer electrodes 193a, 193b adjacent to the corner region of the central electrode 192 are disposed in a way such that the steps SC are formed. Thus, the first outer electrode 193a and the central electrode 192 are disposed with the first slit pattern 195a interposed therebetween, and the fifth horizontal electric field directed to the interior of the pixel PX may be formed. In such an embodiment, the sixth horizontal electric field F6 in the opposite direction to the fifth horizontal electric field F5 may also be formed. In the region A, due to the fifth horizontal electric field F5 formed between the first outer electrode 193a and the corner region of the central electrode 193 with the first slit pattern 195a interposed therebetween, and the seventh horizontal electric field F7 formed between the second outer electrodes 193b and the corner region of the central electrode 192 disposed with the second slit pattern 193b interposed therebetween, the liquid crystal molecules 302 behaving in the corner region of the pixel PX collide with one another, and thus, the alignment similar to the average liquid crystal azimuth angle 310 may be provided. Moreover, in the region disposed on the liquid crystal control pattern 195c, a tenth horizontal electric field F10 directed to the corner direction of the central electrode 192 may be formed. Since the electrode corresponding to the corner direction of the central electrode 192 is not present similarly to the region B in the region in which the tenth horizontal electric field F10 is formed, the horizontal electric field corresponding to the tenth horizontal electric field F10 may not be formed.

As described above, in such an embodiment of the liquid crystal display 1 according to the invention, the liquid crystal control pattern 195c is defined in the corner region of the pixel PX and the liquid crystal molecules 310-1 irregularly aligned in the corner region of the pixel PX are controlled to be regularly aligned, such that the initial response speed and the transmittance are improved.

Therefore, by forming an electric filed vector capable of secondarily aligning the liquid crystal molecules 302 disposed in the corner region of the pixel PX, the regular inclination in the direction of the average liquid crystal azimuth angle 310 may be provided in the corner region. That is, deterioration in the display quality that may occur due to the irregular arrangement of the liquid crystal molecules in the corner region of the pixel PX, i.e., the region A, may be effectively prevented.

FIGS. 7 and 8 show that the region B of a comparative embodiment in which the liquid crystal molecules 302 are irregularly aligned in the corner region of the pixel PX when electric fields are applied and the transmittance is lowered.

In an exemplary embodiment of the invention, as illustrated in FIG. 7, the liquid crystal molecules 302 may be regularly aligned in the corner region of the pixel PX in which the liquid crystal control pattern 195c is aligned when electric fields are applied, and the transmittance is improved.

As described above, in an exemplary embodiment, the first and second outer electrodes 195a, 195b are disposed to correspond to the corner region of the central electrode 192 in the pixel PX, the liquid crystal control pattern 195c is disposed in the corner region of the pixel PX to control the liquid crystal molecules 302 that irregularly behaves in the corner region of the pixel PX, such that the initial response speed and the transmittance are improved.

FIGS. 9 to 12 are layout diagrams of a liquid crystal display according to alternative embodiments of the invention. The same or like elements shown in FIGS. 9 to 12 have been labeled with the same reference characters as those described above with reference to FIGS. 1 to 6, and any repetitive detailed description thereof will hereinafter be omitted or simplified, for convenience of description.

Figure 9:
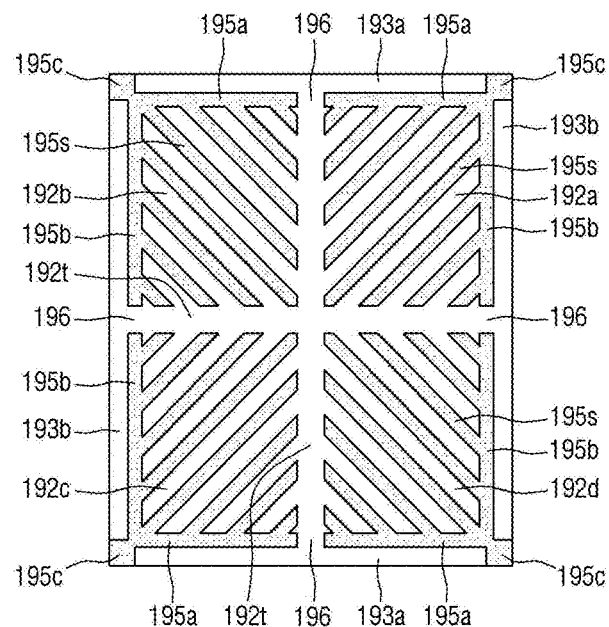
FIGS. 9 to 12 are layout diagrams of a liquid crystal display according to alternative embodiments of the invention.

Referring to FIG. 9, the liquid crystal display 1 according to an alternative embodiment of the invention may include a third slit pattern 195s which is formed to extend in different directions from each other in the first and second slit patterns 195a, 195b. The first and second slit patterns 195a, 195b are disposed in an inward direction of the central electrode 192, that is, in an oblique direction inwardly to a center of the pixel PX. Further, a liquid crystal control pattern 195c disposed in the corner region of the pixel PX may be provided.

In such an embodiment, the pixel electrode 191 is connected to the first and second outer electrodes 193a, 193b by the first and second and third slit pattern 195a, 195b, 195, and a cross-shaped stem section 192t may be defined. That is, the third slit pattern 195s is not defined in the branch shape of the central region of the central electrode 192, and a stem-shaped stem section 192t may be disposed in the central region of the central electrode 192.

By providing the branch section having a shape extending in oblique directions in the central region of the pixel PX, the pixel PX may be formed to have a plurality of domains (Da to Dd). Like the configuration in which the central electrode 192 is connected to the first and second outer electrodes 193a, 193b by the connection electrode 196, in this embodiment, the stem section 192t may be connected to the first and second suburbs electrode 193a, 193b by the connection electrode 196. Therefore, the connection electrode 196 may be disposed to be included in the stem section 192t. The liquid crystal display 1 having the stem section 192t disposed in the pixel PX may selectively dispose the incision 283, 286 in the common electrode 280.

The pixel electrode 191 may include branch electrodes (192a, 192b, 192c, 192d) that extend in different direction from at least one side of the stem section 192t and are in contact with a part of the first and second slit patterns 195a, 195b. Each of the branch electrodes (192a, 192b, 192c, 192d) may be disposed in a plurality of domains (Da to Dd). A pitch H between the branch electrodes (192a to 192d) or between the third slit pattern 195s may be in a range of about 5 μm to 7 μm.

In an exemplary embodiment, the widths of the first slit pattern 195a, the second slit pattern 195b, the third slit pattern 195s and the branch electrodes (192a to 192d) may be substantially the same as each other. In an exemplary embodiment, the first and second outer electrode 193a, 193b may have substantially the same width as the width of the branch electrode (192a to 192d). In an exemplary embodiment, the width of the branch electrodes (192a to 192d) may be in a range of 1 μm to 5 μm. In one exemplary embodiment, for example, the width of the branch electrodes (192a to 192d) may be in a range of 2 μm to 4 μm.

Among the branch electrodes (192a, 192b, 192c, 192d), the branch electrode disposed in the first domain Da is referred to as a first branch electrode 192a, the branch electrode disposed in the second domain Db is referred to as a second branch electrode 192b, and the branch electrode disposed in the third domain Dc is referred to as a third branch electrode 192c, and the branch electrode disposed in the fourth domain Dd is referred to as a fourth branch electrode 192d.

The first branch electrode 192a is disposed in the first domain Da and obliquely extends in the upper right direction from a horizontal stem section 192t or a vertical stem section 192t, and the second branch section electrode 192b is disposed in the second domain Db and may be disposed to obliquely extend in the left upper direction from the horizontal stem section 192t or the vertical stem section 192t. The third branch electrode 192c is disposed in the third domain Dc and extends in the lower left direction from the horizontal stem section 192t or the vertical stem section 192t, and the fourth branch electrode 192d may be disposed in the fourth domain Dd and may be disposed to obliquely extend in the lower right direction from the horizontal stem section 192t or the vertical stem section 192t.

The first and second electrodes 192a, 192b may be disposed at an angle of about 45° or about 135° with the horizontal stem section 192t. The third and fourth branch electrodes 192c, 192d may be disposed at an angle of about 225° or about 315° with the horizontal stem section 192t. The branch electrodes (192a to 192d) of the adjacent two domains (Da to Dd) may be substantially perpendicular to each other.

In such an embodiment, the branch electrodes (192a, 192b, 192c, 192d) may be disposed in a way such that the elongation direction of the branch electrodes (192a, 192b, 192c, 192d) forms an angle in a range of about 30° to about 60° with respect to the polarization axis of the polarizing plate.

As described above, in an exemplary embodiment, where the branch electrodes (192a, 192b, 192c, 192d) extend from the stem section 192t, texture is reduced while the liquid crystal controllability is improved, and the transmittance and the response speed may be improved. In such an embodiment, when the adjacent branch electrodes (192a, 192b, 192c, 192d) asymmetrically extend with each other in the liquid crystal display 1, that is, when the end portions of the branch electrodes (192a, 192b, 192c, 192d) are disposed to correspond to the third slit pattern 195s of the adjacent pixel PX, performance such as liquid crystal controllability may be effectively improved.

Thus, when the third slit pattern 195s separates the branch electrodes (195a to 195d), the third slit pattern 195s and the branch electrodes (192a to 192d) are disposed in an oblique direction or a diagonal direction of the stem section 192t, and thus, the liquid crystal molecules 302 may be aligned at an average liquid crystal azimuth angle 310 in which the maximum transmittance may be realized.

As described above, in an exemplary embodiment, the liquid crystal molecules 302 may be inclined in the azimuth angle direction of the average liquid crystal through two stages. Similarly, in such an embodiment shown in FIG. 9, the liquid crystal molecules 302 may be inclined in the length direction of the branch electrodes (192a to 192d).

In such an embodiment, since the liquid crystal molecules 310 dispose the third slit pattern 195s in the interior of the pixel PX and may incline the liquid crystal molecules 302 in the direction of the first to four directors (301a, 301b, 301c, 301d) under the influence of the fringe fields (F1 to F4) even in the interior, it is possible to improve the response speed of the liquid crystal display 1.

Figure 12:
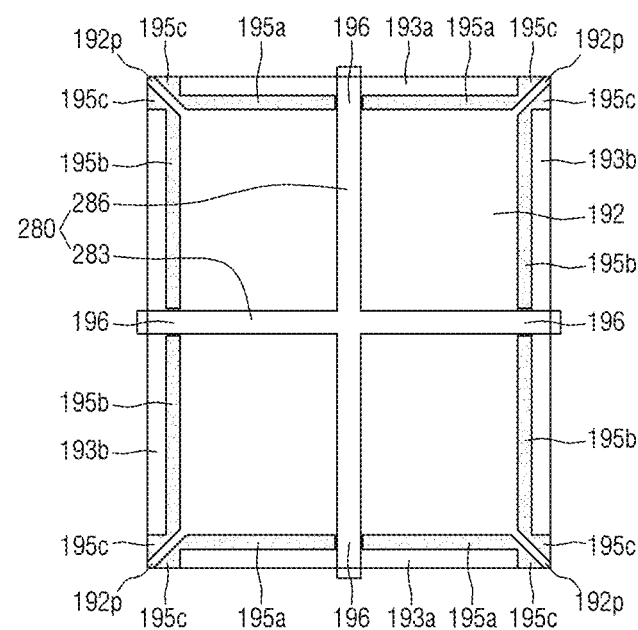

Referring now to FIG. 12, in another alternative exemplary embodiment, a protruding electrode 192P may extend through the region where the liquid crystal control pattern 195c is disposed in the corner region of the central electrode 192. The protruding electrode 192P is disposed in a part of the region in which the liquid crystal control pattern 195c is disposed, and may be disposed to be spaced apart from each of the first and second outer electrodes 193a, 193b.

In such an embodiment, the protruding pattern 192P allows the liquid crystal molecules 302 to incline in a regular direction, by controlling the irregular alignment of the liquid crystal molecules 302 that may be generated in the corner region of the pixel PX. As described above with reference to FIGS. 5 and 6, the protruding electrode 192 disposed in the corner region of the pixel PX forms the fifth horizontal electric field F5 and the seventh horizontal electric field F7 so that the liquid crystal molecules 302 may be regularly aligned in the corner region of the pixel PX.

In such an embodiment, the end portion of the corner region of the central electrode 192 and the end portions of the first and second outer electrodes 193a, 193b may be formed to form the step as described above using a fine patterning process to form the end portions of the first and second outer electrodes 193a, 193b. In an exemplary embodiment, as shown in FIG. 12, the protruding electrode 192P may be more easily provided in the region in which the liquid crystal control pattern 195c is disposed, without using a fine patterning process.

Thus, in such an embodiment, the liquid crystal display 1 may effectively or efficiently improve the initial response speed and the transmittance, by providing the protruding electrodes 192p in the corner region of the pixel PX and by controlling the liquid crystal molecules 310-1 irregularly aligned in the corner region of the pixel PX to be regularly aligned.

Figure 10:
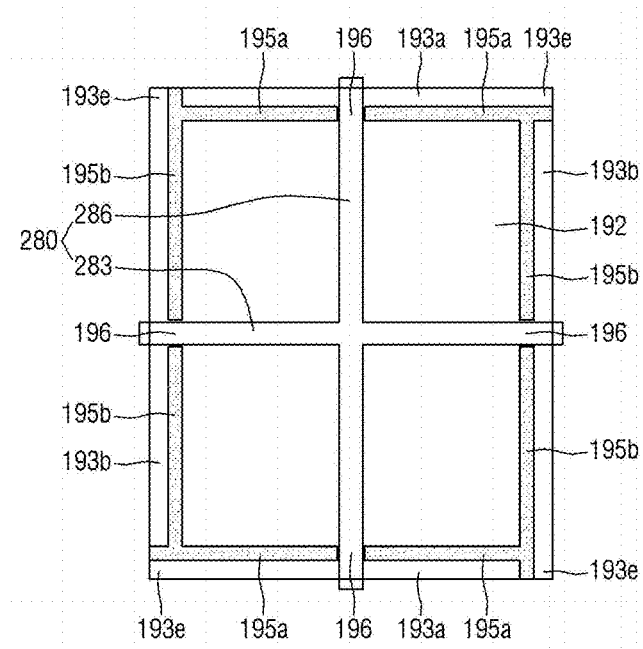
Figure 11:
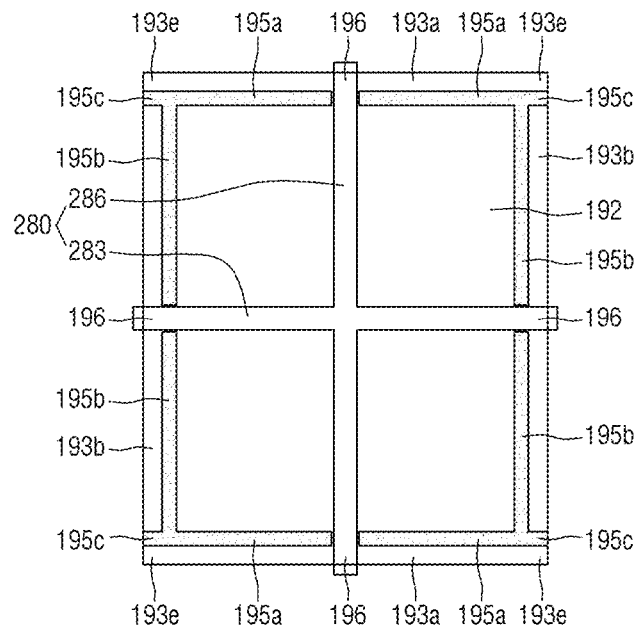

Referring to FIGS. 10 and 11, an extension electrode 193e may be provided to extend to the region in which the liquid crystal control pattern 195c is disposed, that is, to the corner region of the pixel PX. Therefore, the liquid crystal control pattern 195c disposed in a direction parallel to the first slit pattern 195a or the second slit pattern 195b may be disposed in the corner region of the pixel PX.

The extension electrode 193e may be extended from the end portion of the first slit pattern 195a or the second slit pattern 195b to the corner region of the pixel PX. In such an embodiment, where the extension electrode 193e is disposed in the corner region of the pixel PX in which the liquid crystal control pattern 195c is disposed, a manufacturing process thereof may be effectively simplified.

In an exemplary embodiment, as illustrated in FIG. 11, the first outer electrode 193a extending in the horizontal direction is extended to the corner region of the pixel PX, to define the extension electrode 193e. In such an embodiment, the liquid crystal control pattern 195c may be defined by an extended portion of the first slit pattern 195a.

In such an embodiment, an electric field formed between the extension electrode 195e and the second outer electrode 193b, and an electric field formed between the second outer electrode 193b and the central electrodes 192 may be formed in the corner region of the pixel PX. Thus, the two electric fields cause the liquid crystal molecules 302 to behave, the behaved liquid crystal molecules 302 collide with one another, and the liquid crystal molecules may be aligned in the direction of the average liquid crystal azimuth angle 310.

In such an embodiment, the extension electrode 193e may extend from the horizontal first outer electrode 193a as shown in FIG. 11, but not being limited thereto. Alternatively, the extension electrode 193e may extend from the vertical second outer electrode 193b as shown in FIG. 10.

In such an embodiment, the inclination directions of the liquid crystal molecules 302 is variously set in the plurality of domains (Da to Dd), and the extension electrode 193e is disposed in the corner region of the pixel PX to increase the formation probability of the liquid crystal molecules 302 having the average liquid crystal azimuth angle 310, such that the transmittance and the initial response speed of the liquid crystal display 1 may be improved.

In an alternative exemplary embodiment, as illustrated in FIG. 10, the extension electrodes 193e extending from the first outer electrode 193a and the second outer electrode 193b may be alternately disposed. Therefore, the electric field is formed by the extension electrode 193e, the liquid crystal molecules behave in the corner region of the pixel PX to control the irregularly aligned liquid crystal molecules to be regularly aligned, and thus, the initial response speed and transmittance of the liquid crystal display 1 may be improved.

Figure 13:
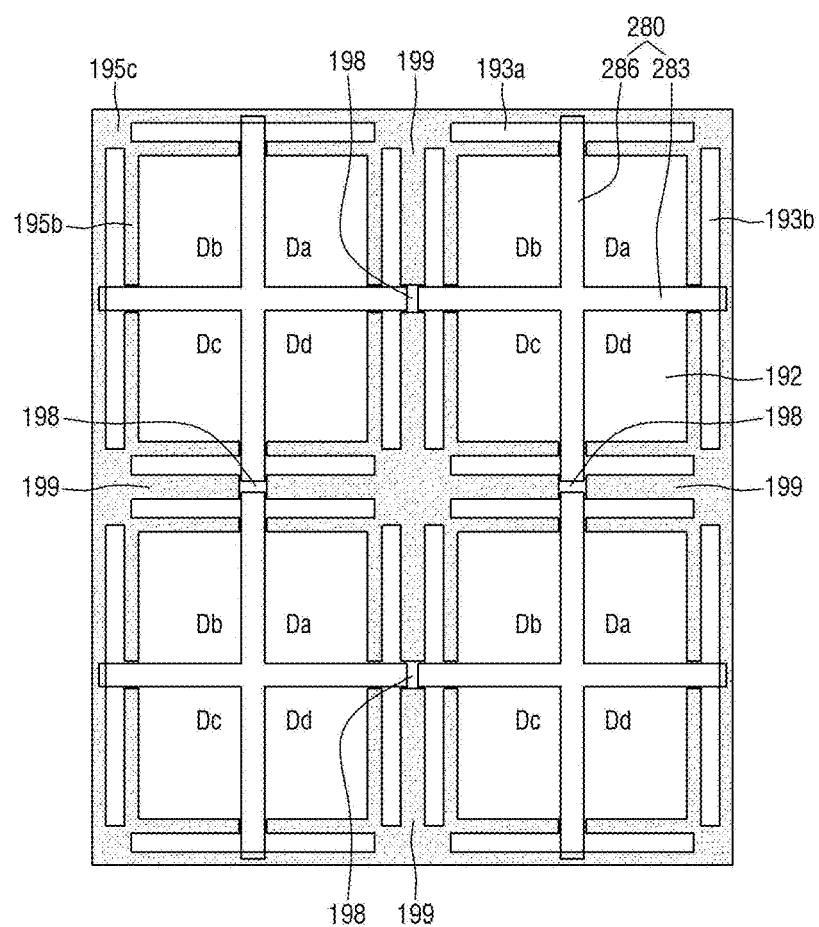
FIGS. 13 to 15 are layout diagrams of a liquid crystal display according to another embodiment of the invention.
Figure 14:
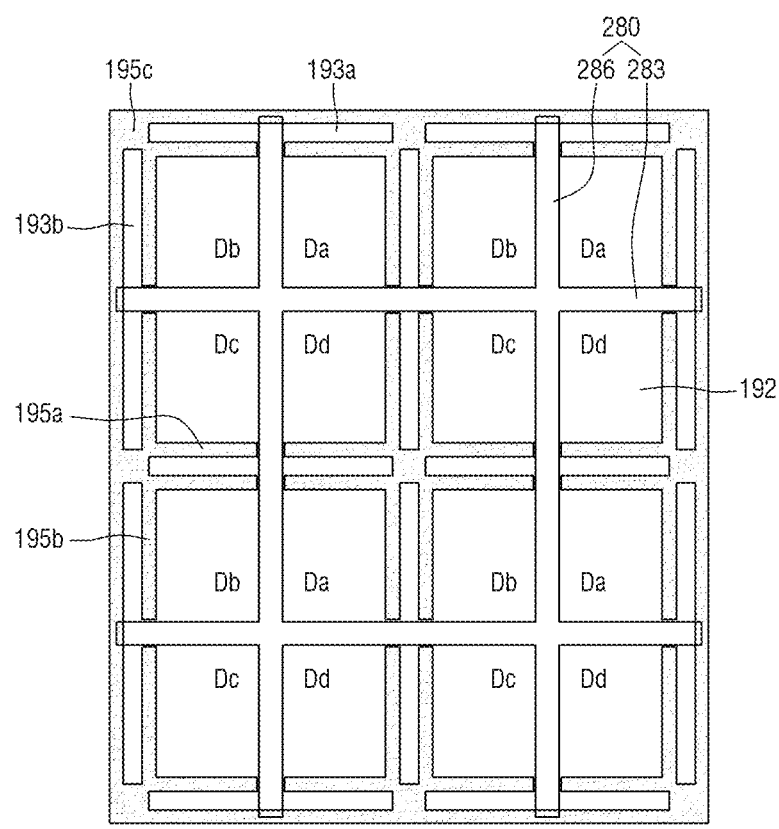
Figure 15:
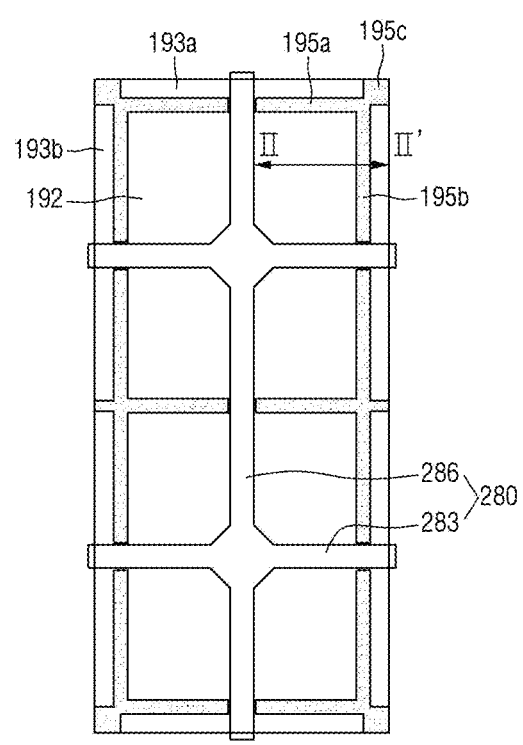
Figure 16:
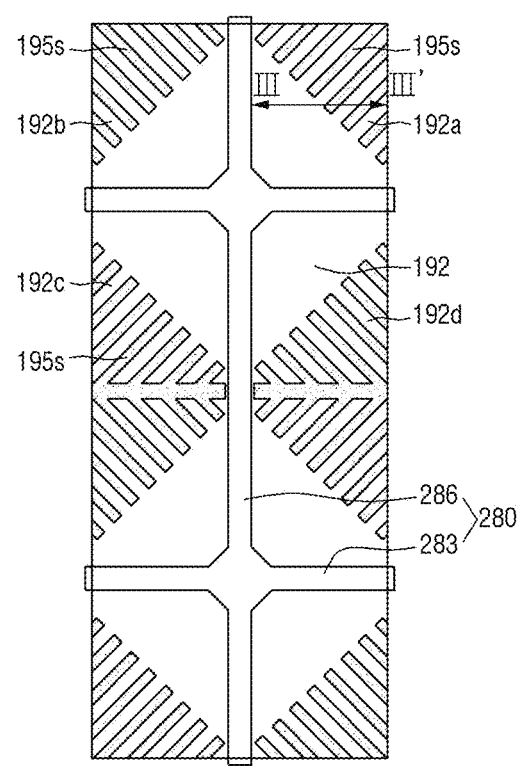
FIG. 16 is a layout diagram of a liquid crystal display according to a comparative embodiment.
Figure 17:
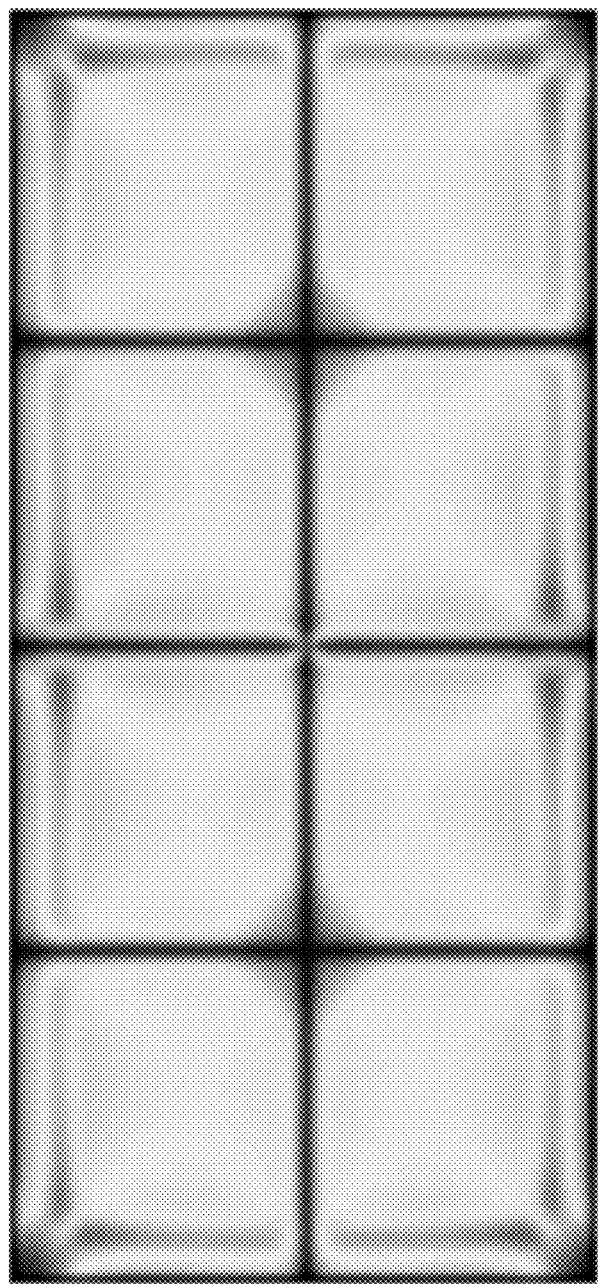
FIGS. 17 and 18 are photographs obtained by capturing the pixels of the liquid crystal display according to FIGS. 15 and 16.
Figure 18:
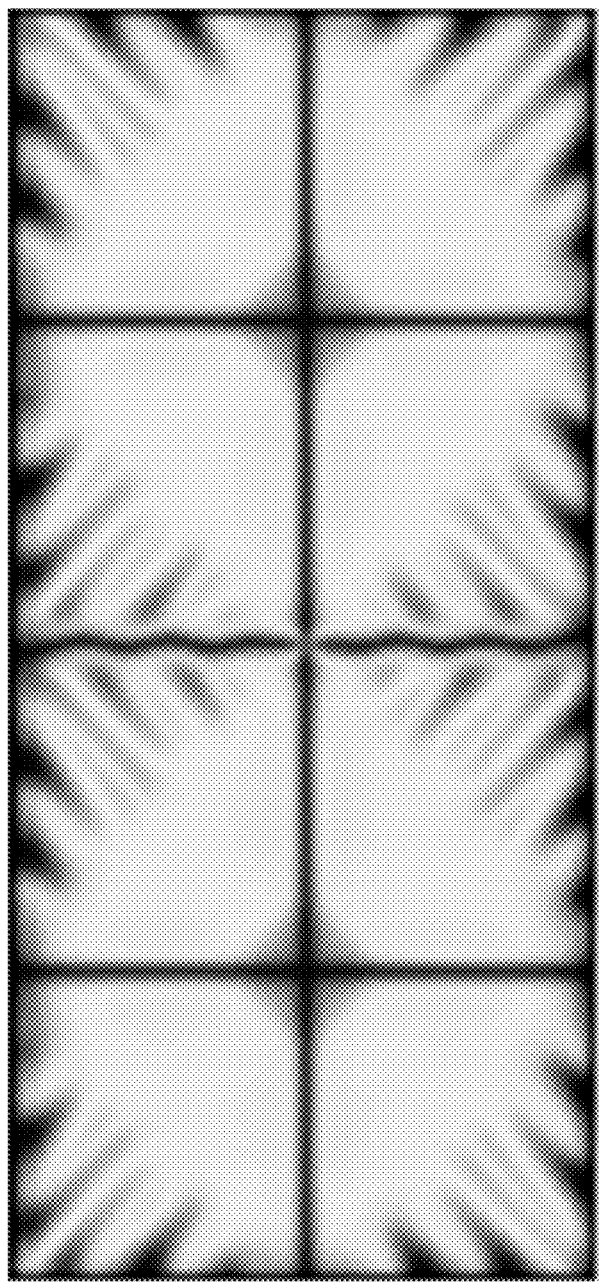
Figure 19:
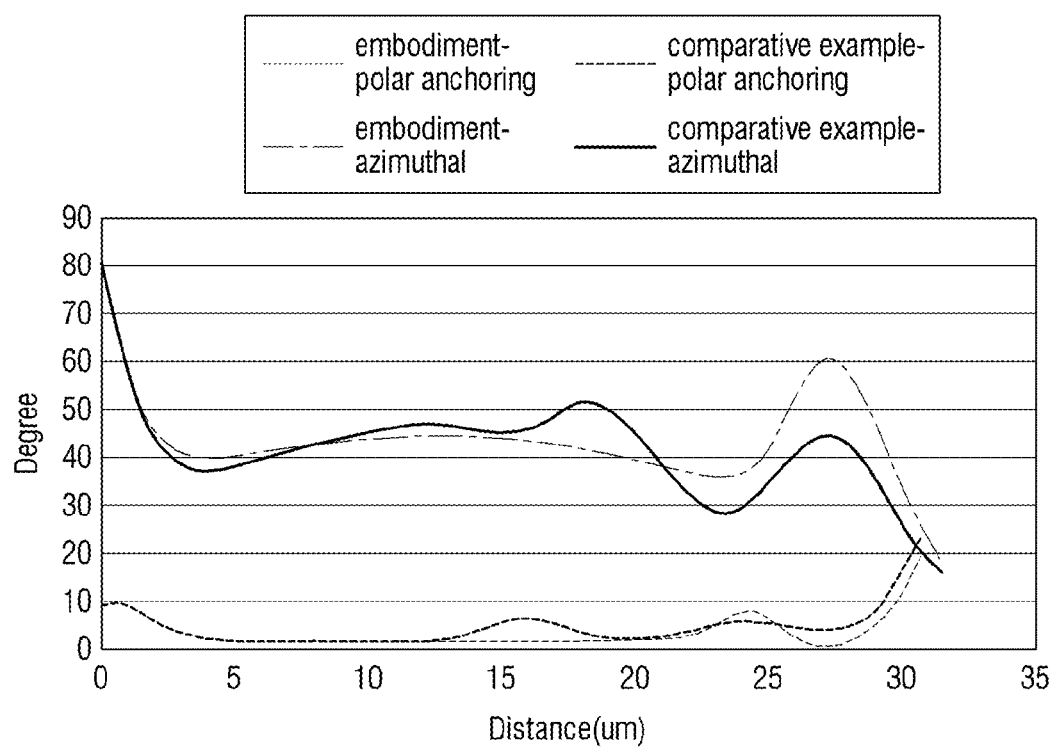
FIG. 19 is a graph illustrating a polar angle of the liquid crystal and an azimuth angle of an exemplary embodiment of the liquid crystal according to the invention and a comparative embodiment of the liquid crystal display.

FIGS. 13 to 15 are layout diagrams of a liquid crystal display according to another embodiment of the invention, FIG. 16 is a layout diagram of a liquid crystal display according to a comparative embodiment, and FIGS. 17 and 18 are photographs obtained by capturing the pixels of the liquid crystal display according to FIGS. 15 and 16. FIG. 19 is a graph illustrating a polar angle of the liquid crystal and an azimuth angle of an exemplary embodiment of the liquid crystal according to the invention and a comparative embodiment of the liquid crystal display. Here, FIGS. 13 to 19 will be described with referring back to FIGS. 1 to 6 for easy explanation.

Referring to FIGS. 13 to 15, the pixel electrode 191 of exemplary embodiments of the liquid crystal display 1 of the invention will be briefly described. The pixel electrode 191 includes a central pattern 192 disposed in the central region of the pixel PX, and the first and second outer electrode 193a, 193b connected to the central pattern 192. The first and second outer electrodes 193a, 193b and the central pattern 192 may be connected to each other by the connection electrode 196.

The first second slit patterns 195a, 195b defined between the central electrode 192 and the first and second outer electrodes 193a, 193b may be formed in the pixel PX. The end portion of the first outer electrode 193a and the end portion of the second outer electrode 193b may be spaced apart from each other by the liquid crystal control pattern 195c.

A plurality of pixel electrodes 191 having such a pattern may be disposed in the region of the pixel PX. As illustrated in FIG. 13, the four pixel electrodes 191 may be disposed in the pixel PX. An intermediate section 199 for spacing the pixel electrodes 191 may be disposed between the pixel electrode 191 and the adjacent pixel electrode 191. Further, a connection section 198 for connecting the pixel electrode 191 and the adjacent pixel electrode 191 may be disposed.

As illustrated in FIG. 15, the pixel electrode 191 and the adjacent pixel electrode 191 may be disposed to be shared by the first outer electrode 193a or the second outer electrode 193b. Thus, such an embodiment, the size of the pixel PX may be reduced by disposing the first outer electrode 193a and the second outer electrode 193b so that either one of the first outer electrode 193a or the second outer electrode 193b is shared.

As illustrated in FIG. 14, one of the first outer electrode 193a or the second outer electrode 193b disposed between the pixel electrode 191 and the adjacent pixel electrode 191 may be omitted. Therefore, one side of the central electrode 192 may be disposed adjacent to one side of the central electrode 192. The electric field is formed between one central electrode 192 and the adjacent central electrode 192, and the liquid crystal molecules disposed in the corner region of the pixel electrode 191 may be aligned in the direction of the average liquid crystal azimuth angle 310.

FIG. 16 shows a structure of a comparative embodiment, where the pixel electrode 191 includes a rhombic-shaped central electrode 192 in the central region, and branch electrodes (192a, 192, 192b, 192c, 192d) extending from a side region of the central electrode 192. FIGS. 17 and 18 are diagrams obtained by capturing a plan view of the pixel in FIGS. 15 and 16.

In an exemplary embodiment of the invention, the response speed of 20.3291 milliseconds (ms) was measured, and in the comparative embodiment, the response speed of 24.3027 ms was measured. That is, in an exemplary embodiment, where the liquid crystal control pattern 195c is defined in the corner region of the pixel PX, the overall response speed is improved while the initial response speed increases.

Further, when the transmittance of the comparative embodiment is defined as 100% as a reference, the transmittance of the exemplary embodiment of the invention was about 105%. That is, transmittance of the exemplary embodiment of the invention is improved by approximately 5% compared to the comparative embodiment. This will be described in greater detail with reference to FIG. 19.

FIG. 19 is a graph illustrating a polar angle of the liquid crystal and an azimuth angle of the liquid crystal of the exemplary embodiment of the invention and comparative embodiment. Here, FIG. 19 measures the polar angle of the liquid crystal and the azimuth angle of the liquid crystal of the region taken along line II-II' in FIG. 15, and measures the polar angle of the liquid crystal and the azimuth angle of the liquid crystal of the region taken along line III-III' in FIG. 16.

Referring to FIG. 19, the measured polar angle of the comparative embodiment of the liquid crystal was about 4.9°, and the measured polar angle of the exemplary embodiment of the liquid crystal according to the invention was about 3.9°. Thus, the lower the polar angle of the liquid crystal is, the more the amount of light transmitted through the liquid crystal molecules is. Thus, as the polar angle of the liquid crystal is lowered, transmittance may be improved. Therefore, as in such an embodiment, as the average of the polar angle of the liquid crystal is lowed, the transmittance of the pixel PX of the liquid crystal display 1 may be improved.

Moreover, the measured azimuth angle of the comparative embodiment of the liquid crystal was about 40.7°, and the measured azimuth angle of the exemplary embodiment of the liquid crystal according to the invention was about 42.4°. It is possible to determine that the liquid crystal molecules aligned at the azimuth angle of about 45° close to the average liquid crystal azimuth angle 310 increases, by disposing the liquid crystal control pattern 195c in the corner region of the pixel PX to minimize an amount of the liquid crystal molecules 302 that are irregularly aligned.

In such an embodiment, the average of the azimuth angle of the liquid crystal becomes close to about 45°, and the transmittance of the pixel may be improved.

Thus, an exemplary embodiment of the liquid crystal display 1 according to the invention may improve the initial response speed and the transmittance, by disposing the liquid crystal control pattern 195c in the corner region of the pixel PX to control the liquid crystal molecules that are irregularly aligned in the corner region of the pixel PX to be regularly aligned.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

Although certain exemplary embodiments and implementations have been described herein, other embodiments and modifications will be apparent from this description. Accordingly, the invention is not limited to such exemplary embodiments, but rather to the broader scope of the presented claims and various obvious modifications and equivalent arrangements.

What is claimed is:

1. A liquid crystal display comprising:
a first panel comprising a first electrode;
a second panel comprising a second electrode and disposed opposite to the first panel; and
a liquid crystal layer comprising a liquid crystal and disposed between the first panel and the second panel,
wherein
the first electrode comprises:
a central electrode disposed in a central region of a pixel;
an outer electrode extending along a side of the central electrode; and
a connection electrode which is separate from and connects the outer electrode and the central electrode,
a slit pattern is defined in the first electrode around the central electrode and between the central electrode and the outer electrode,
a liquid crystal control pattern is defined in the first electrode in a corner region of the pixel extends to define an outer boundary of the pixel, is in contact with the outer electrode and is connected to the slit pattern,
horizontal and vertical incisions, which divide the first electrode into a plurality of domains, are defined in the second electrode,
an end portion of the outer electrode disposed adjacent to the liquid crystal control pattern is disposed to correspond to the corner region of the pixel, and
the end portion of the outer electrode extends farther than a corresponding side of the central electrode.

2. The liquid crystal display of claim 1, wherein the outer electrode comprises:
a first outer electrode disposed in a direction parallel to a horizontal side of the central electrode; and
a second outer electrode disposed in a direction parallel to a vertical side of the central electrode,
wherein at least one end portion of the first and second outer electrodes is connected to the liquid crystal control pattern.

3. The liquid crystal display of claim 2, wherein the first electrode further comprises:
a protruding electrode extending from the central electrode through the corner region of the pixel, and disposed between the first and second outer electrodes,
wherein the liquid crystal control pattern is defined between the protruding electrode and the first or second outer electrode.

4. The liquid crystal display of claim 2, wherein
the slit pattern comprises:
a first slit pattern disposed parallel to the first outer electrode and between the first outer electrode and the central electrode; and
a second slit pattern that is disposed parallel to the second outer electrode and between the second outer electrode and the central electrode, and
wherein
an end portion of the first and second slit patterns is in contact with the connection electrode, and
another end portion of the first and second slit patterns is connected to the liquid crystal control pattern.

5. The liquid crystal display of claim 4, wherein widths of the first and second slit patterns and the first and second outer electrodes are in a range of about 4 micrometers to about 8 micrometers.

6. The liquid crystal display of claim 4, wherein
the liquid crystal control pattern is disposed parallel to the first slit pattern or the second slit pattern, and
the outer electrode further comprises an extension electrode which extends from the first outer electrode or the second outer electrode to the corner region of the pixel.

7. The liquid crystal display of claim 1, wherein
the first electrode further comprises a plurality of branch electrodes extending from the central electrode in a predetermined direction toward the first and second slit patterns, and
the slit pattern further comprises a third slit pattern defined between the branch electrodes.

8. The liquid crystal display of claim 7, wherein extension directions of the branch electrodes in different domains are different from each other.

9. The liquid crystal display of claim 7, wherein a pitch of the branch electrodes is in a range of about 4 micrometers to about 8 micrometers.

10. The liquid crystal display of claim 7, wherein a width of the branch electrodes is in a range of about 1 micrometer to about 5 micrometers.

11. The liquid crystal display of claim 7, wherein an extension direction of the branch electrodes in a domain and a direction of an average azimuth angle of the liquid crystal in the domain are substantially the same as each other.

12. The liquid crystal display of claim 7, further comprising:
a first polarizing plate disposed on the first panel; and
a second polarizing plates disposed on the second panel and having a polarization axis perpendicular to a polarization axis of the first polarizing plate,
wherein the extension direction of the branch electrode forms an angle in a range of about 30 degrees to about 60 degrees with respect to the polarization axis of the first or second polarizing plate.

13. The liquid crystal display of claim 7, wherein widths of the branch electrode and the first, second and third slit patterns are substantially the same as each other.

14. The liquid crystal display of claim 1, wherein a width of the outer electrode is in a range of about 1 micrometer to about 5 micrometers.

15. The liquid crystal display of claim 1, wherein widths of the horizontal and vertical incisions are in a range of about 2 micrometers to about 5 micrometers.

16. The liquid crystal display of claim 1, wherein the horizontal and vertical incisions extend farther than the outer electrode and is disposed to correspond to the connection electrode.

17. The liquid crystal display of claim 1, wherein
a plurality of first electrodes defines the pixel, and
an intermediate section is defined between two adjacent first electrodes in the pixel.

18. The liquid crystal display of claim 17, wherein the intermediate section comprises a connection section which connects the outer electrode of one of the two adjacent first electrodes and the outer electrode of the other of the two adjacent first electrodes.

19. The liquid crystal display of claim 1, wherein the liquid crystal control pattern provides an electric filed vector which controls the liquid crystal disposed in the corner region of the pixel and the liquid crystal control pattern in a regular direction.

20. The liquid crystal display of claim 1, wherein
an average polar angle of the liquid crystal is in a range of about 3.5 degrees to about 4.5 degrees, and an average azimuth angle of the liquid crystal is in a range of about 40 degrees to about 45 degrees.

* * * * *